United States Patent
Kunkel et al.

(10) Patent No.: US 10,979,613 B2
(45) Date of Patent: Apr. 13, 2021

(54) AUDIO CAPTURE FOR AERIAL DEVICES

(71) Applicant: Dolby Laboratories Licensing Corporation, San Francisco, CA (US)

(72) Inventors: Timo Kunkel, Kensington, CA (US); Cong Zhou, Fremont, CA (US); Vivek Kumar, San Bruno, CA (US); Remi S. Audfray, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/785,977

(22) Filed: Oct. 17, 2017

(65) Prior Publication Data
US 2018/0234612 A1 Aug. 16, 2018

Related U.S. Application Data

(60) Provisional application No. 62/521,246, filed on Jun. 16, 2017, provisional application No. 62/409,290, filed on Oct. 17, 2016.

(51) Int. Cl.
*H04N 5/232* (2006.01)
*G06T 7/70* (2017.01)
(Continued)

(52) U.S. Cl.
CPC ....... *H04N 5/23203* (2013.01); *B64C 39/024* (2013.01); *G06T 7/70* (2017.01);
(Continued)

(58) Field of Classification Search
None
See application file for complete search history.

(56) References Cited

U.S. PATENT DOCUMENTS 8,437,537 B2   5/2013  Chang
9,076,032 B1   7/2015  Mesolongitis
(Continued)

FOREIGN PATENT DOCUMENTS

CN   104038716   9/2014
CN   104811667   7/2015
CN   104950885   9/2015

OTHER PUBLICATIONS

Grenzdorffer, G.J. et al "UAV Based BRDF—Measurements of Agricultural Surfaces with Pfiffikus" International Archives of the Photogrammetry, Remote Sensing and Spatial Information Sciences, vol. XXXVIII-I/C22, Sep. 14-16, 2011, Zurich, Switzerland.
(Continued)

*Primary Examiner* — Heather R Jones

(57) ABSTRACT

Methods, systems, and computer program products for automatically positioning a content capturing device are disclosed. A vehicle, e.g., an UAV, carries the content capturing device, e.g., a camcorder. The UAV can position the content capturing device at a best location for viewing a subject based on one or more audio or visual cues. The UAV can follow movement of the subject to achieve best audio or visual effect. In some implementations, a controller device carried by the subject can generate one or more signals for the UAV to follow. The controller device may be coupled to a microphone that records audio. The signals can be used to temporally synchronize video captured at the UAV and audio captured by the microphone.

20 Claims, 17 Drawing Sheets

(51) Int. Cl.
*H04N 5/04* (2006.01)
*B64C 39/02* (2006.01)

(52) U.S. Cl.
CPC .......... *H04N 5/04* (2013.01); *H04N 5/23206* (2013.01); *H04N 5/23216* (2013.01); *H04N 5/23222* (2013.01); *H04N 5/23293* (2013.01); *B64C 2201/027* (2013.01); *B64C 2201/108* (2013.01); *B64C 2201/127* (2013.01); *G06T 2207/10016* (2013.01)

(56) References Cited

U.S. PATENT DOCUMENTS

| | | |
|---|---|---|
| 2014/0132727 A1 | 5/2014 | Chandraker |
| 2015/0117758 A1 | 4/2015 | Chandraker |
| 2015/0172636 A1 | 6/2015 | Gordon |
| 2016/0127641 A1* | 5/2016 | Gove .................... G06T 1/0007 348/143 |
| 2016/0179096 A1* | 6/2016 | Bradlow .............. G05D 1/0669 701/8 |
| 2016/0336020 A1* | 11/2016 | Bradlow ................. G01S 19/49 |
| 2017/0220036 A1* | 8/2017 | Visser ................... G05D 1/0808 |
| 2017/0371353 A1* | 12/2017 | Millinger, III ......... G05D 1/101 |

OTHER PUBLICATIONS

Torres-Martinez, J.A. et al "A Multi-Data Source and Multi-Sensor Approach for the 3D Reconstruction and Visualization of a Complex Archaeological Site: The Case Study of Tolmo de Minateda" The International Archives of the Photogrammetry, Remote Sensing and Spatial Information Sciences, vol. XL-5/W4, 3D Virtual Reconstruction and Visualization of Complex Architectures, Feb. 25-27, 2015, Avila, Spain.

Lensch, H. et al "Image-Based Reconstruction of Spatial Appearance and Geometric Detail" ACM Transactions on Graphics, vol. V. No. N, Month 20YY, pp. 1-27.

Colomina, I. et al "Unmanned Aerial Systems for Photogrammetry and remote Sensing: A Review" ISPRS Journal of Photogrammetry and Remote Sensing, 2014, pp. 79-97.

Belezina, Jan "OpenEars Headphones Designed to Bring Binaural Sound Recording to the Mainstream" Jun. 8, 2015.

Record Sound with Pilot app, in Phantom, May 29, 2015 http://www.phantompilots.com/threads/record-sound-with-pilot-app.43440/.

Pattison, A. et al "Flycast: Autonomous Drone & Broadcast System" Dec. 2015.

* cited by examiner

AUDIO CAPTURE FOR AERIAL DEVICES

CROSS-REFERENCE TO RELATED APPLICATION(S)

This application claims the benefit of priority to U.S. Provisional Patent Application No. 62/521,246, filed Jun. 16, 2017, and to U.S. Provisional Patent Application No. 62/409,290, filed Oct. 17, 2016, both of which are hereby incorporated by reference in their entirety.

TECHNICAL FIELD

This disclosure relates generally to the capturing multimedia content.

BACKGROUND

When capturing an image of a subject, a photographer can compose the image partly by adjusting various controls of a video or still-image camera and by moving to certain positions around the subject. For example, the photographer can select a field of view by selecting a focal length for the camera and selecting a distance between the camera and the subject. A longer focal length or a shorter distance can make the subject appear bigger in the image. In various situations, e.g., during a live concert, conference or sport event, the photographer may not be able to move to certain positions sufficiently close to the subject. If the photographer cannot get close to the subject, the photographer may have to increase the focal length, even if doing so may not satisfy specific cinematographic needs of the photographer. For example, for certain cinematographic purposes, a particular focal length is preferred over other focal lengths. The photographer may desire a dramatic emphasis on a subject, where a short (e.g., 24 mm) focal length at close range is preferred over a long (e.g., 200 mm) focal length from a distance. In the example scenarios listed above, it may be impossible for the photographer to move to a perfect location for a perfect focal length to achieve the desired dramatic emphasis.

SUMMARY

Techniques of automatic positioning of a content capturing device are described. A content capturing device, e.g., a video or still-image camera or an audio recorder, can capture visual or audio content at a scene, e.g., a live concert. A content analyzer can analyze audio or visual objects in the captured content, and determine locations of the sources of the digital objects, e.g., digital representations of individual performers at the live concert. Based on the locations and a set of rules, e.g., rules specifying which performer should be emphasized from which particular angle, the content analyzer determines an optimal location for the content capturing device. Through a controller or directly, the content analyzer then instructs a carrier of the content capturing device, e.g., an unmanned aerial vehicle (UAV, sometimes referred to as a drone), to move to the location. The content capturing device can capture content once the carrier arrives at the location.

In some implementations, a content analyzer identifies, from a first digital image captured by a camera device mounted on a carrier, individual visual objects including a first object and a second object. The content analyzer can detect, from a second digital image capture by the camera device, that a visual impairment, either optical or artistic, in the second digital image of the first object by the second object occurred, for example, due to movement of the first object or movement of the second object. The content analyzer determines a counter movement of the camera device. The counter movement can correct the visual impairment caused by the movement of the first object or the movement of the second object. A controller generates one or more commands for controlling the carrier based on the counter movement. The controller submits one or more commands to the carrier. The one or more commands can include a navigation command that causes the carrier to move according to the counter movement.

In some implementations, the content analyzer determines a counter movement of the first object or a counter movement of the second object. The content analyzer can then instruct the first object or the second object to move to correct the visual impairment. For example, the content analyzer can generate a voice command to be played by speaker or an in-year monitor worn by a person, or generate a remote control command to turn wheels to steer an object into a particular direction for a particular distance.

In some implementations, a content analyzer receives audio signals of one or more sound sources from an audio recorder mounted on a carrier. The audio signals have original characteristics, e.g., relative position, loudness, beat-strength, reverberation and pitch. The content analyzer determines, based on visual information or audio information, that a sound source of the one or more sound source moved, e.g., an acoustic and unplugged guitarist walks towards the recording device. The movement of the sound source changes the characteristics of the audio signals. The content analyzer determines a counter movement of the recording device that maintains or restores the original characteristics of the audio signals. A controller generates one or more commands for controlling the carrier based on the counter movement. The controller then submits one or more commands to the carrier of the recording device. The one or more commands can include a navigation command that causes the carrier to move according to the counter movement.

In some implementations, a content analyzer receives, from a microphone array mounted on a carrier, audio signals of multiple sound sources. The content analyzer determines that an exemplary sound source of the sound sources generates a sound that is louder by at least a threshold level over sound generated by other sound sources. The content analyzer determines a movement of the microphone array that is toward the exemplary sound source. A controller generates one or more commands for controlling the carrier based on the movement. The controller submits one or more commands to the carrier of the recording device. The one or more commands can include a navigation command that causes the carrier to make the movement.

In some implementations, in aerial video capturing, a video camera is carried by a UAV, a corresponding audio recorder is coupled to a controller of the UAV. The controller emits a guiding signal that guides the UAV to follow the controller. Audio and video signals are captures separately. The controller also generates synchronization signals such that the audio and video signals can be synchronized at a later time.

The features described in this specification can achieve one or more advantages over conventional audio and video technology. The features improve upon conventional manual audio and video processing technology by automated positioning of a video or audio content capturing device. The disclosed technology can enable a UAV to fly to, and hover at, a position near a performer or speaker where a photographer is unable to access. The disclosed technology allows the UAV to follow the performer or speaker when the performer or speaker moves, thus creating clear audio and video recordings of uniform cinematographic attributes and balanced audio level.

The disclosed technology provides a framework that enhances conventional audiovisual content production approaches by automatically selecting best viewpoints for recording visual content and sweet spots for recording audio content. The selection can be based on dynamics of a performance, rather than a preset position. For example, the disclosed technology can adapt a camera or microphone to a moving performer, to ensure the moving performer does not occlude another performer or be occluded by another performer or by a piece of equipment.

The disclosed techniques improve on conventional video recording technologies where a cinematographer or cameraperson places a camera at best viewing points. Based on input of simple parameters, e.g., on which performer the camera should emphasize, a system implementing the disclosed technology can position the camera at the right place, even when the performer moves. Accordingly, a user lacking cinematographic experience can have well-composed images.

Likewise, the disclosed implementations improve upon conventional audio recording technologies where sound is mixed at a mixing console. In conventional audio recording, when signals of sound arrive at a mixing console, the signals may already have defects that require manipulation to correct. Using disclosed technology, a sound recording system can prevent some of the defects from occurring by adjusting a position of a microphone dynamically and automatically, e.g., by following a moving performer or speaker. The defect prevention can simplify the mixing process, allowing amateur sound engineers to produce satisfactory sound effect.

In conventional airborne video capturing, a video camera and a microphone are carried by an aerial vehicle. The aerial vehicle is usually at a distance from a subject. A distance between the microphone and the subject is usually much longer than a distance between the microphone and the aerial vehicle. Accordingly, noise from the aerial vehicle, e.g., from rotors of the aerial vehicle, can be significant relative to the sound from the subject. The signal-to-noise ratio can be low.

The disclosed techniques improve upon conventional techniques in that the disclosed techniques can have higher signal-to-noise ratio, due to proximity of the microphone and the subject. By placing a microphone on a controller of the aerial vehicle rather than on the aerial vehicle, audio recording can reduce or eliminate rotor noise. Thus, for example, virtual reality (VR) content creators and consumers can generate higher quality content. A biker, surfer, or skier may wear a controller device that causes a UAV to follow the controller device. A camera onboard the UAV can generate a video recording of the wearer's actions. The wearer of the controller device can speak while moving. The controller device may record the narratives. The narratives can be synchronized with the video recording by one or more synchronization signals. The narratives can then be incorporated into the video recording based on the one or synchronization more signals. The resulting video recording can thus capture the excitement of the sport in both video and audio.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Example Positioning Based on Camera Focal Length Requirement

Figure 1A:
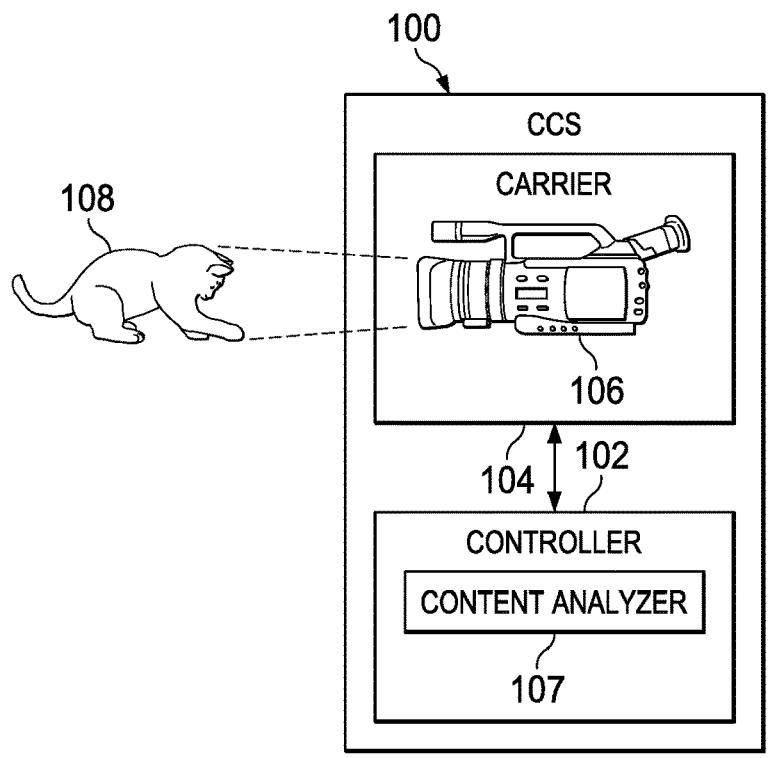
FIGS. 1A-1E are diagrams illustrating example techniques of positioning a content capturing device to maintain specified visual characteristics of a subject.
Figure 1B:
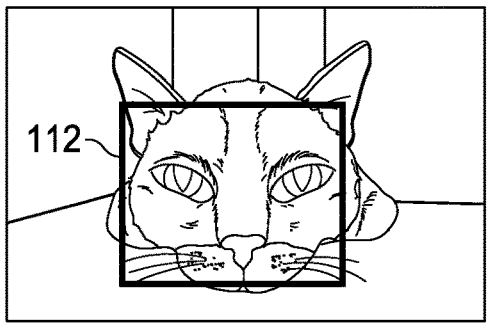
Figure 1C:
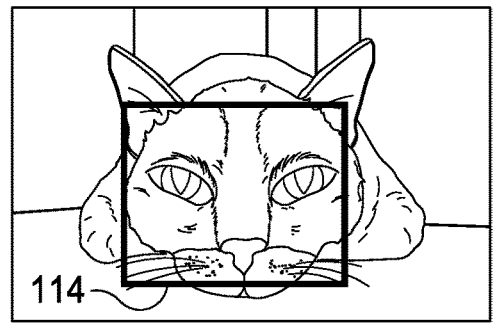

FIGS. 1A-1E are diagrams illustrating example techniques of positioning a content capturing device to maintain specified visual characteristics of a subject. In FIG. 1A, content capturing system 100 can include a controller 102, a device carrier (or simply referred to as a carrier) 104, and a content capturing device 106. The content capturing device 106 can be a still-image or video camera, a recorder including a microphone, or any combination of the above. The carrier 104 can be a device, e.g., a UAV or a dolly configured to move in response to command from the controller 102. The controller 102 can include one or more computers, e.g., a smart phone or a wearable device, that positions the carrier. For example, when the carrier 104 is a UAV or a part of a UAV, the controller 102 can be a computer onboard the UAV or wirelessly coupled to the UAV and controls a position and an orientation of the UAV in a three-dimensional space. In some implementations, the controller 102 may also control functions of the content capturing device 106. For example, when the content capturing device 106 is a camera, the controller 102 may control parameters including focal length, exposure time, aperture, sensor amplification (e.g., ISO settings) and auto focus area of the camera, baseline between two stereo cameras, among others.

The controller 102 can include, or otherwise be coupled with, a content analyzer 107. The content analyzer 107 receive, through a user interface or an application program, specifications of an image to be captured. For example, through user input or programmed parameters, the content analyzer 107 can determine a size of a subject 108 as appeared in a digital image captured by the content capturing device 106. When the size is fixed by user input or the programmed parameters, different focal lengths may produce different effects of the digital image. For example, as shown in FIGS. 1B through 1E, the face of the subject 108 have the same size, as shown by frames 112, 114, 116 and 118. Due to different focal lengths, the ratios of the face compared to other portions of the subject 108 are different, where shorter focal length can correspond to a larger ratio. For example, in FIG. 1B, a wide-angle, short focal length (e.g., 24 mm) lens results in a large ratio of face versus body; in FIG. 1C, a medium-wide, medium focal length (e.g., 35 mm) lens results in medium-large ratio; in FIG. 1D, a portrait focal length (e.g., 50 mm) lens results in a medium ratio; in FIG. 1E, a telephoto focal length (e.g., 200 mm) lens results in a smaller ratio.

Figure 1D:
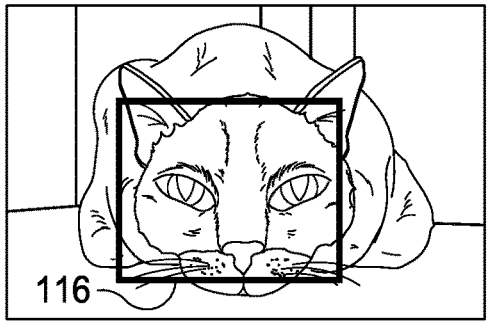
Figure 1E:
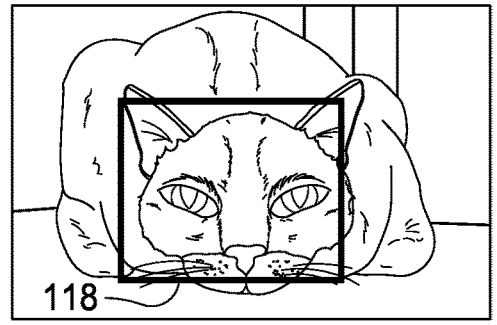

The specifications received by the content analyzer 107 can include a desired ratio, e.g., the ratio of a face and body of the subject 108 as shown in FIG. 1D. In some implementations, the ratio can be specified in pre-programmed photographic requirement (e.g., preferring maintaining most natural look in a digital image to dramatic emphasis). In response, the content analyzer 107 can determine both a focal length of the content capturing device 106 and a distance between the content capturing device 106 and the subject 108. In calculating the distance, the content analyzer 107 determines a vantage point based on the specified ratio, the focal length, and one or more cinematographic and aesthetic parameters, e.g., preferences on front, back, top, side or flood light.

The content analyzer 107 provides the vantage point and focal length to the controller 102. The controller 102 then determines movement parameters, e.g., flight parameters, for the carrier to move to the position. The controller 102 can determine the movement parameters based on attributes of the carrier 104 (e.g., whether the carrier 104 is a fixed wing UAV or a rotary wing UAV), attributes of spaces around the subject 108 (e.g., ceiling height and wall positions). The controller 102 can determine the movement parameters further based on environments and attributes of the UAV, e.g., stability control, wind compensation, rotor noise level, among others. The controller 102 can generate the movement parameters accordingly.

The controller 102 then submits one or more first commands to the content capturing device 106 to zoom to the focal length, and submits one or more second commands to the carrier 104 to move to the vantage point from the subject 108 according to the movement parameters. The one or more second commands can include flight control commands associated with coordinates in a three-dimensional reference frame, or distances represented as vectors in a three-dimensional reference frame. The flight control commands can direct the carrier 104, e.g., a UAV, to fly to the vantage point.

In some implementations, the controller 102, in association with the content analyzer 107, can generate commands the direct the carrier 104 to follow movement of the subject 108. Using computer vision, the content analyzer 107 can identify stationary objects in digital images captured by the content capturing device 106, and use the stationary objects as reference to track the position of subject 108 when the subject 108 is moving. In some implementations, the content analyzer 107 can detect sound object by tracking the movement. Additional details are disclosed in reference to FIG. 2.

Example Positioning Based on Sound Field Optimization

Figure 2:
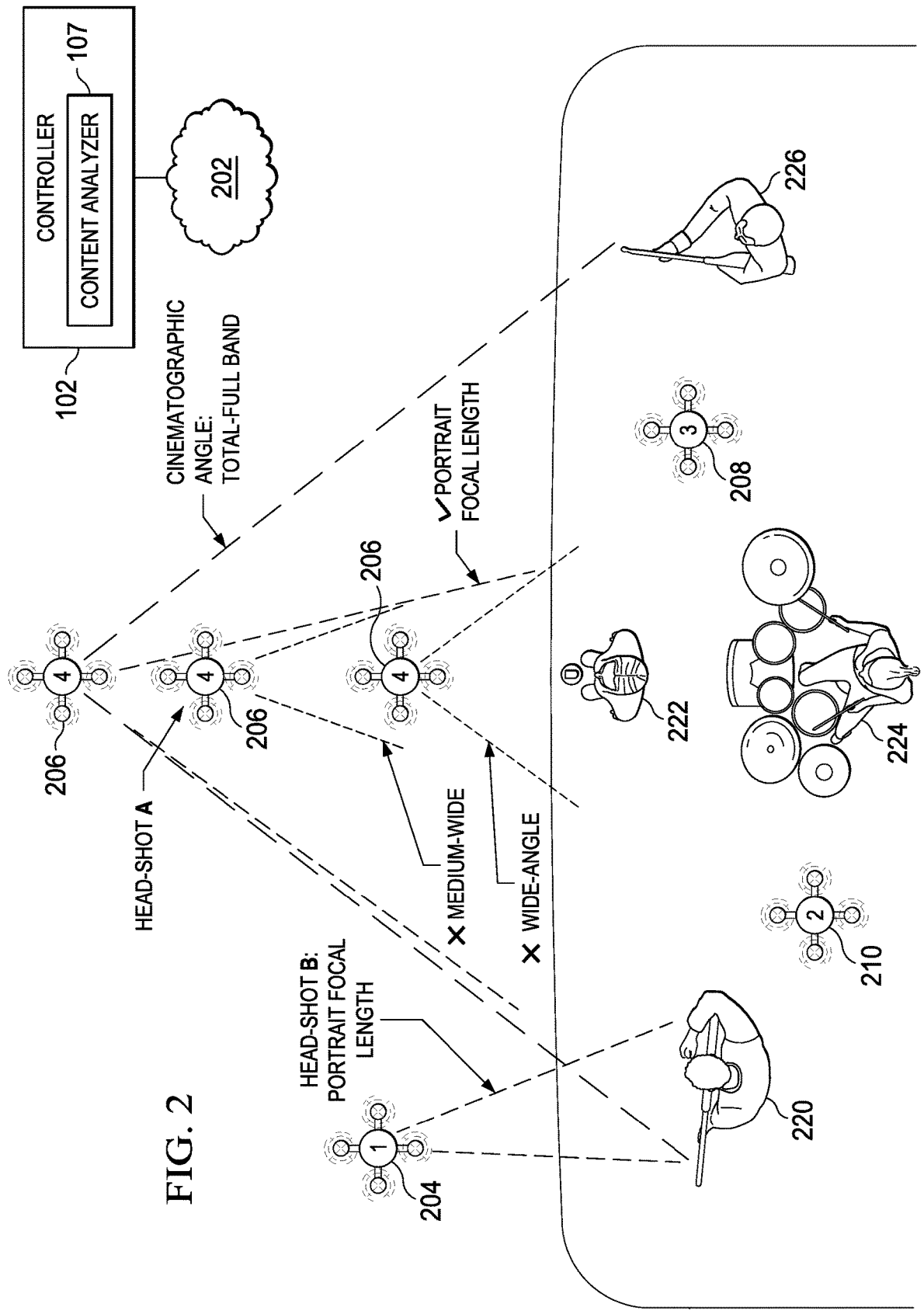
FIG. 2 is diagram illustrating example techniques of positioning a content capturing device for various cinematographic compositions of an event.

FIG. 2 is diagram illustrating example techniques of positioning a content capturing device for various cinematographic compositions of an event. A controller 102 is coupled to a communication network 202. Through communication network 202, the controller 102 controls recording devices 204, 206, 208 and 210. Each of recording devices 204, 206, 208 and 210 includes a content capturing device, e.g., the content capturing device 106 of FIG. 1A, mounted on a carrier, e.g., the carrier 104 of FIG. 1A. The controller 102 can position the recording devices 204, 206, 208 and 210 at an event, e.g., a live concert as shown. Given the number of recording devices as a parameter, the controller 102 can automatically determine a respective position of each of the recording devices 204, 206, 208 and 210 based on original parameters, user inputs, sound optimization, image optimization or any combination of the above.

For example, in some implementations, the controller 102 can deploy the recording devices 204, 206, 208 and 210 at the event or a rehearsal of the event, initially randomly or by following an initial pattern. From digital images captured at the initial locations, the content analyzer 107 can determine number of performers in the event based on face recognition techniques. The content analyzer 107 can then assign one or more recording devices to each performer upon determining that there are more recording devices than performers, or assign one or more performers to each recording device upon determining that there are more performers than recording devices. The content analyzer 107, through the controller 102, can then position a recording device corresponding to a performer at a vantage point from the performer based on cinematographic, audio rules, or any combination of both.

The cinematographic rules can include, for example, a pre-set preference on a size of a performer in a digital image, a preferred focal length, a ratio of full band view over individual performer view, among others. The audio rules can include a recording level of a microphone, a direction of the microphone, among others. The controller 102 can then position the recording devices 204, 206, 208 and 210 by providing respective commands and coordinates in a three-dimensional reference frame to each of the recording devices 204, 206, 208 and 210.

In the example shown, the content analyzer 107 determines, using facial recognition techniques, that multiple performers 220, 222, 224 and 226 are present at the event. The content analyzer 107 can determine a respective location of each of the performers 220, 222, 224 and 226. The location can be coordinates in a 3D reference frame. The content analyzer 107 can receive and update reference location coordinates from a user interface, e.g., a touch screen or a voice recognition module of a mobile device.

The content analyzer 107 can receive, from a rule database, one or more cinematography rules to be applied to digital images of the event. The rule database can be populated by user input, default artistic settings, various visual effects, output of an application program, or any combination of the above. For example, a first rule specified for the event can be dedicating X percent (e.g., 5%) of live video time to a headshot of a performer 220. A second rule specified for the event can be applying dolly zoom (sometimes referred to as Hitchcock zoom) to a performer 222 once in the live video of the event. In some implementations, the rule database can be populated by machine learning algorithms, deep learning algorithms, or both. For example, the content analyzer 107 can analyze previously captured content, e.g., from rehearsal or previous similar events, or analyze current content on the fly while the current event is in progress and determine artistic composition for capturing visual and audio content going forward.

Based on these rules received from the rule database and the locations of the performers 220, 222, 224 and 226, the content analyzer 107 can calculate a first position for recording device 204 and a first corresponding focal length (e.g., 100 mm for a headshot). The first position can be a first set of coordinates in the reference frame. The content analyzer 107 can provide the positions to the controller 102. The controller 102 determines one or more instructions for moving the recording device 204 to the first position. The controller 102 can then submit the instructions to the recording device 204 causing recording device 204 (e.g., a UAV carrying a camera) to move to and stay at the first position and pointing a lens set to 100 mm at the performer 220 for X percent of live video time.

Based on these rules received from the rule database and the locations of the performers 220, 222, 224 and 226, the content analyzer 107 can calculate a set of second locations for the recording device 206, as shown in FIG. 2. To maintain the dolly zoom, the controller can set a lens at wide angle at a second position close to the performer 222, a medium-wide angle at a second position close-to-medium to the performer 222, a portrait photo length at a second position medium-far to the performer 222, and a telephoto focal length at a second position far from the performer 222. The terms "close" and "far" refer to the second positions relative to one another. The controller 102 can determine a flight path for the recording device 206 based on the locations calculated by the content analyzer 107, and submit the flight path and commands to follow the flight path to the recording device 206. The controller 102 can submit zoom level associated with the flight path to the recording device 206.

In the example shown, the content analyzer 107 can determine to use recording devices 204 and 206 as audio-video recording devices, and to use recording devices 208 and 210 as audio-only recording devices. Accordingly, through the controller 102, the content analyzer 107 can position recording devices 208 and 210 at locations suitable for audio recording but may be unsuitable for image capturing, e.g., behind the backs of the performers 220 and 226.

Each of the controller 102 and content analyzer 107 can be implemented in a respective or same smart phone or a tablet, laptop or a desktop computer. In FIG. 2, the controller 102 is shown to include the content analyzer 107 and to be connected to the 204, 206, 208 and 210 through the communication network 202. In some implementations, the controller 102 and the content analyzer 107 are implemented on separate computers, and are coupled to one another through the communication network 202. In some implementations, at least one of the controller 102 of the content analyzer 107 can be implemented on a flight controller onboard a UAV on one or more recording devices 204, 206, 208 and 210.

Figure 3A:
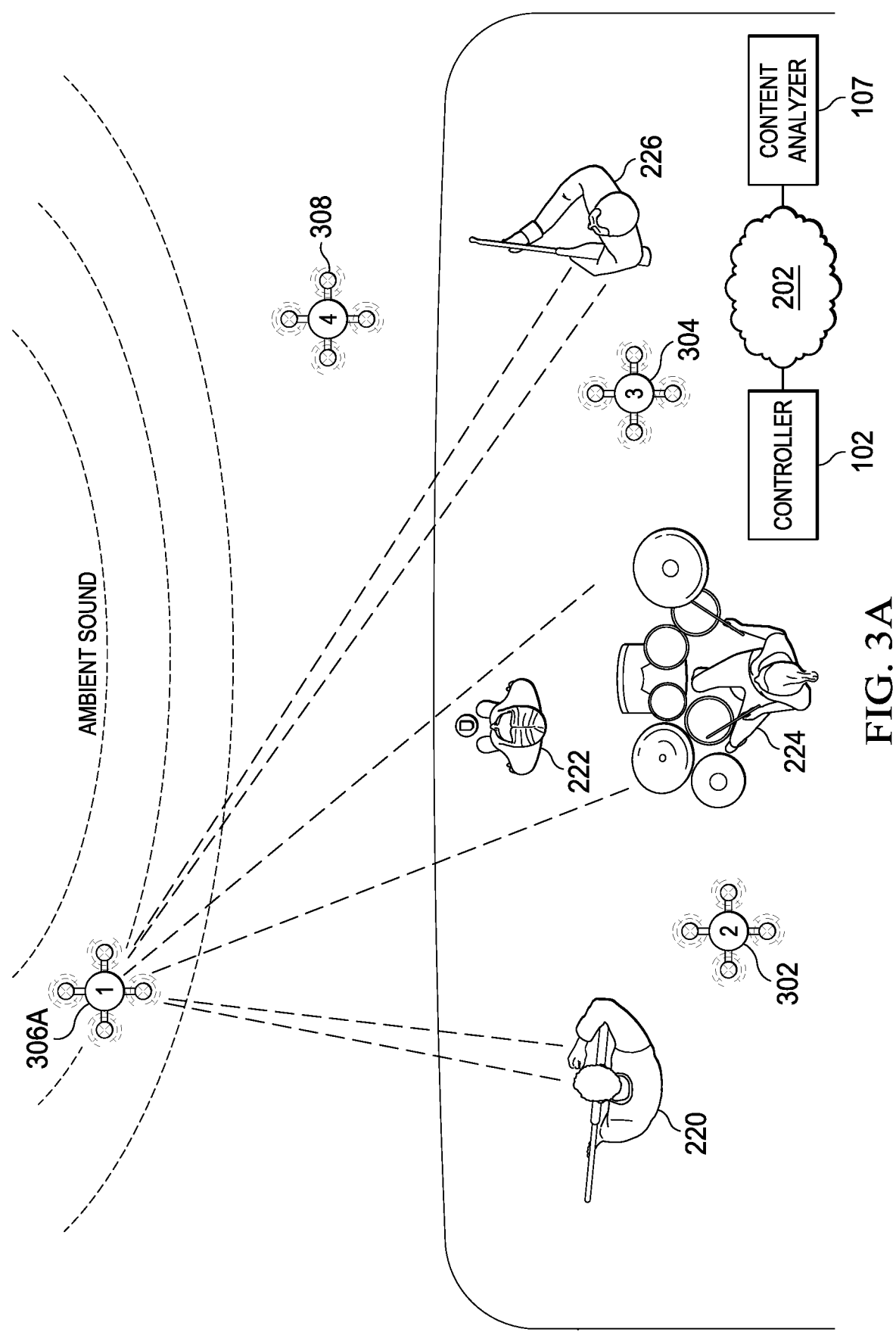
FIGS. 3A and 3B are diagrams illustrating example techniques of positioning a content capturing device for capturing a spatial sound field.
Figure 3B:
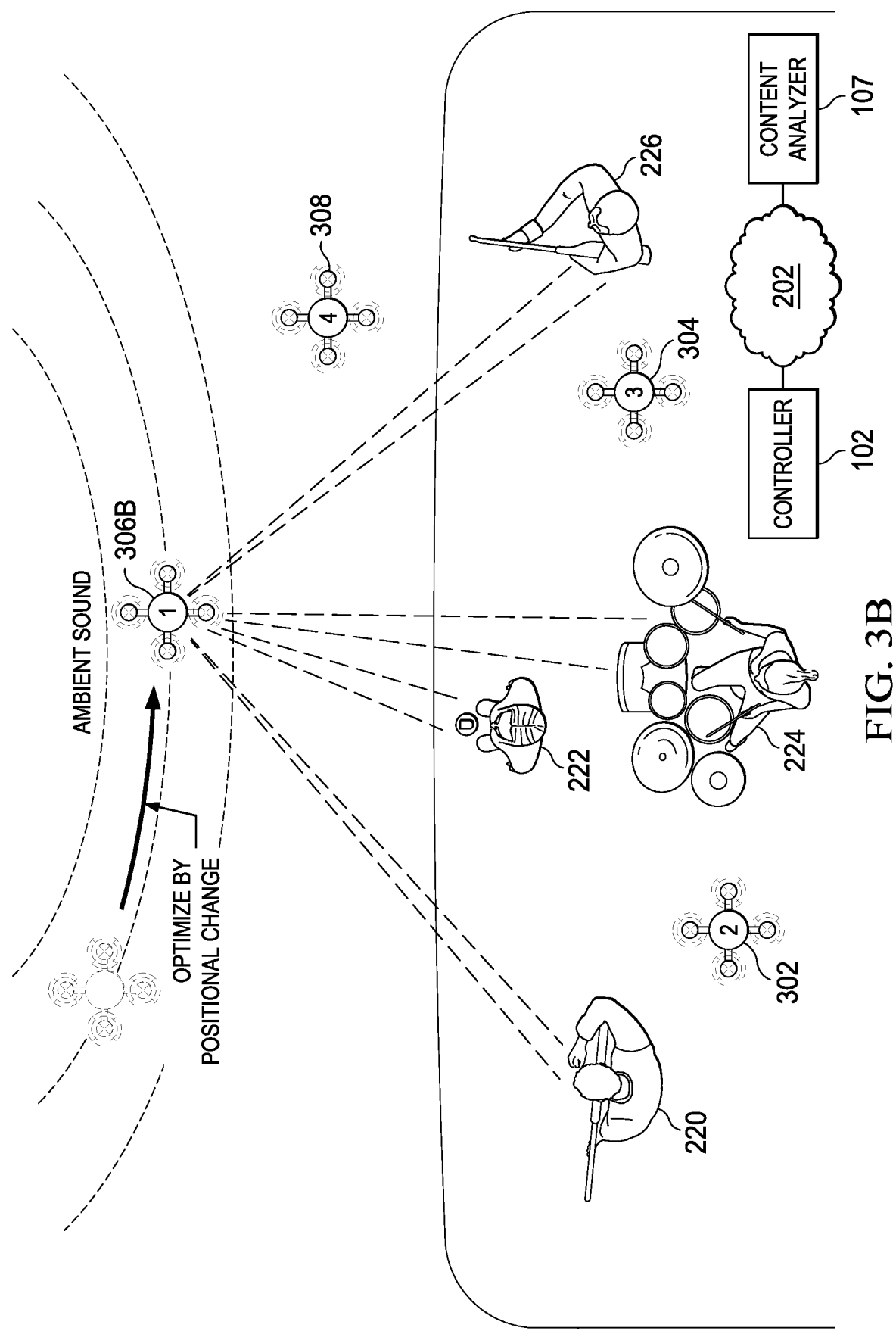

FIGS. 3A and 3B are diagrams illustrating example techniques of positioning a content capturing device for capturing a spatial sound field. In FIG. 3A, a content analyzer 107 determines initial positions of recording devices 302, 304, 306A and 308 at an event, e.g., a concert. Each of the recording devices 302, 304, 306A and 308 can include a respective audio-video (AV) recorder mounted on a respective carrier, e.g., a UAV. The content analyzer 107 can determine the initial locations based on cinematographic rules as described above in reference to FIG. 2. The content analyzer 107 can provide the initial locations to the controller 102. The controller 102 can generate movement commands, e.g., flight commands, according to the initial locations. The controller 102 can issue the commands to direct each of the recording devices 302, 304, 306A and 308 to the initial locations, and to start recording audio and video signals of the event.

During live recording, or during a rehearsal, the recording devices 302, 304, 306A and 308 capture audio signals. The recording devices 302, 304, 306A and 308 can submit the captured audio signals to the content analyzer 107. The content analyzer 107 can include an audio analyzer, which is a device configured to determine ways to improving sound quality of recorded signals by positioning recording devices during signal capture time a live performance, rather than by mixing recorded signals already captured. The content analyzer 107 can analyze sound quality and iteratively optimize the sound quality by changing positions of one or more of the recording devices 302, 304, 306A and 308.

For example, the content analyzer 107 can determine that, as positioned, the recording device 306A records too strong a signal from some performers 220 and 222 than from performer 226, in that, for example, the level, e.g., loudness, of sound from performers 220 and 222 is more than a threshold higher than that from performer 226. The content analyzer 107 can determine the respective sound level of each individual performer using various source separation and sound recognition techniques. In response to determining that the signal or signals from performers 220 and 222 are too strong over the signal or signals from performer 226, the content analyzer 107 can move the recording device 306A to compensate for the strong signals. The content analyzer 107 can determine, based on the positions of the performers 220, 222 and 226, that respective distances between the recording device 306A and the performers 220, 222 and 226 can be adjusted to increase the level of performer 226. The content analyzer 107 can determine a new position where, based on the adjusted distances, the difference in levels of sound from the performers 220, 222, and 226 is less. The content analyzer 107 then provides the new position to the controller 102.

In response, the controller 102 generates commands for moving the recording device 306A to the new position. The controller 102 then submits the commands to the recording device 306A, directing the recording device 306A to move to the new position. In response to the command, the recording device 306A moves to the new position as indicated in FIG. 3B as the recording device 306B, where the distance between the recording device 306B with the performer 220 is increased compared to the recording device 306A, and the distances between the recording device 306B and performers 224 and 226 are decreased, resulting a more balanced sound level overall.

The content analyzer 107 can determine, based on video or audio signals captured by the recording devices 302, 304, 306A and 308, that one or more performers 220, 222, 224 and 226 moved. In response, the content analyzer 107 can request the controller 102 to adjust the positions of one or more of the recording devices 302, 304, 306B and 308, e.g., by following or avoiding the moving performer. The controller 102 can instruct the recording devices 302, 304, 306B and 308 to move to the new position, and to follow or avoid the moving performer along the way.

In FIGS. 3A and 3B, the content analyzer 107 is coupled to controller 102 and the recording devices 302-308 through communications network 202. In various implementations, the content analyzer 107 can be a component of the controller 102, or be a component of a recording device 306B. In various implementations, each of the recording devices 302, 304, 306A, 306B and 308 includes an AV capture device mounted on a UAV sufficiently small such that the hum of rotors is sufficiently high over the frequency of audio signals from the performers 220, 222, 224 and 226, e.g., higher by a threshold level (e.g., 25 kHz vs. 20 kHz, where the difference is 5 kHz). The threshold level is a frequency level where the hum can be filtered out. Alternatively, or additionally, the microphones can be shielded from the sound generated by the carrier's propulsion system. In addition, the content analyzer 107 can determine, from signals captured by the recording devices 302, 304, 306A, 306B and 308, that some audio signals are from ambient sound sources, e.g., by determining that before and after movement, a recording device receives the same sound level from the sound sources. The content analyzer 107 can cancel out, or cause a mixer to cancel out, the sound from the ambient sound sources.

Example Architecture for Automatic Positioning

Figure 4:
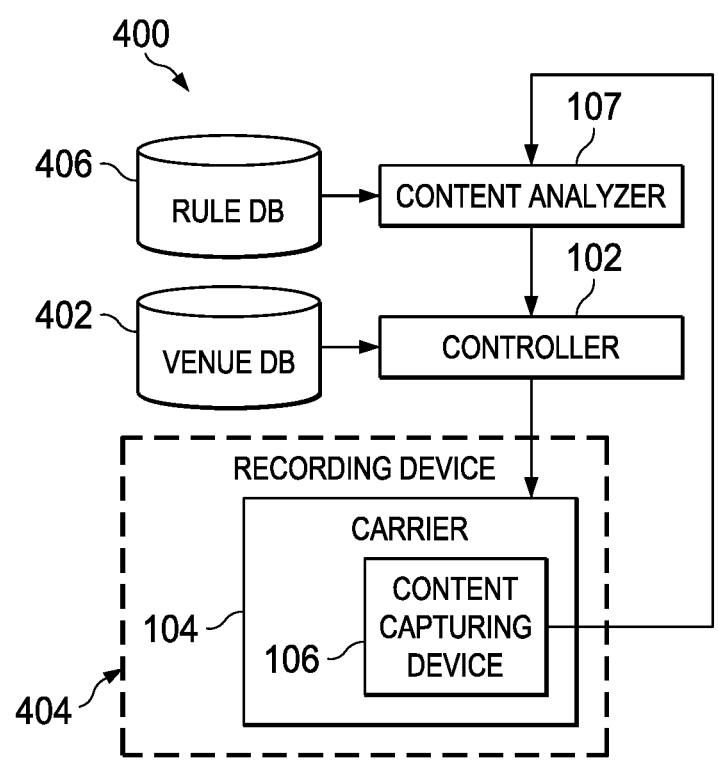
FIG. 4 is a block diagram illustrating example system for positioning a content capturing device.

FIG. 4 is a block diagram illustrating example system 400 for positioning a content capturing device based on sound source. The system 400 can include components each including one or more processors. The components can include a recording device 404. The recording device 404 can include a content capturing device 106 mounted on a carrier 104. The recording device 404 can be any recording device described above in reference to FIGS. 2, 3A and 3B. The content capturing device 106 can include a video camera having a fixed or zoom lens or alternatively an image capture system based on computational photography approaches simulating the behavior of a zoom lens. On the content capturing device 106, aperture, focal length, focal point or any combination of the above can be controlled remotely. The carrier 104 can be a device that is configured to position itself given coordinates in a 3D reference frame, and to point the content capturing device 106 at a given angle. Some examples of the carrier 104 include a UAV or a ground or rail based carrier, e.g., an automated dolly, a crane, a blimp or a submersible.

The components of the system 400 can include a controller 102. The controller 102 can be mounted on the recording device 404, e.g., as a flight controlling computer of a UAV, or remotely coupled to the recording device 404 through a communications network. The controller 102 can include, or be coupled with, a venue database 402. The venue database 402 can store one or more venue maps of spaces around an event. A venue map can include, for example, an internal map or flour plan of a structure (e.g., a concert hall, a sports stadium, or a conference hall). The venue database 402 can receive the venue map from a venue map service, e.g., by downloading the venue map. The venue database 402 can receive the venue map from a user input.

The controller 102 can include, or be coupled with, a content analyzer 107. The content analyzer 107 can be an audio analyzer, an image analyzer, or both. An audio analyzer can be a device configured to receive audio signals from one or more recording devices 404, and determine a sound field from the received signals. The sound field can include, for example, positions of sound sources including performers and instruments, and loudness of each sound source to other sound sources. The content analyzer 107 can estimate a best position of a given recording device 404 for achieving optimized sound quality, e.g., a sound field where loudness of the sound sources is balanced. An image analyzer can be a device configured to identify, track visual objects, e.g., faces of performers.

The content analyzer 107 can be coupled to a rule database 406. The rule database 406 can store one or more cinematographic rules and audio rules as described above, and one or more visibility rules, which are described in further details below. The rules can, for example, be manually predetermined, or computed via machine learning approaches using previous or real-time training data sets. The content analyzer 107 can determine a position the recording device 404 at an event or at a scene based on the rules. The content analyzer 107 provides the position to the controller 102.

The controller 102 determines a path of moving from the recording device 404 from a current location to the position provided by the content analyzer 107 based on the venue database. The controller 102 then directs the recording device 404 to move to that position. This process of moving the recording device 404, estimating a best position by the content analyzer 107, and directing the controller 102 to move the recording device 404 again without violating the rules in the rule database 406 and without hitting walls, ceilings or other constraints specified in the venue database 402 can be performed iteratively during a rehearsal or during live performance to achieve the best audio and video result.

In some implementations, the interaction and coordination between the content analyzer 107, the controller 102 and the recording device 404 can track movement of a sound source visually, e.g., through face recognition or by audio, e.g., based on change of sound field. The content analyzer 107 and the controller 102 can then control one or more recording devices 404 to compensate for the movement to maintain the sound field, as well as to maintain a visual composition as specified in a rule that is stored in the rule database 406.

Example Positioning Based on a Dominant Sound Source

Figure 5A:
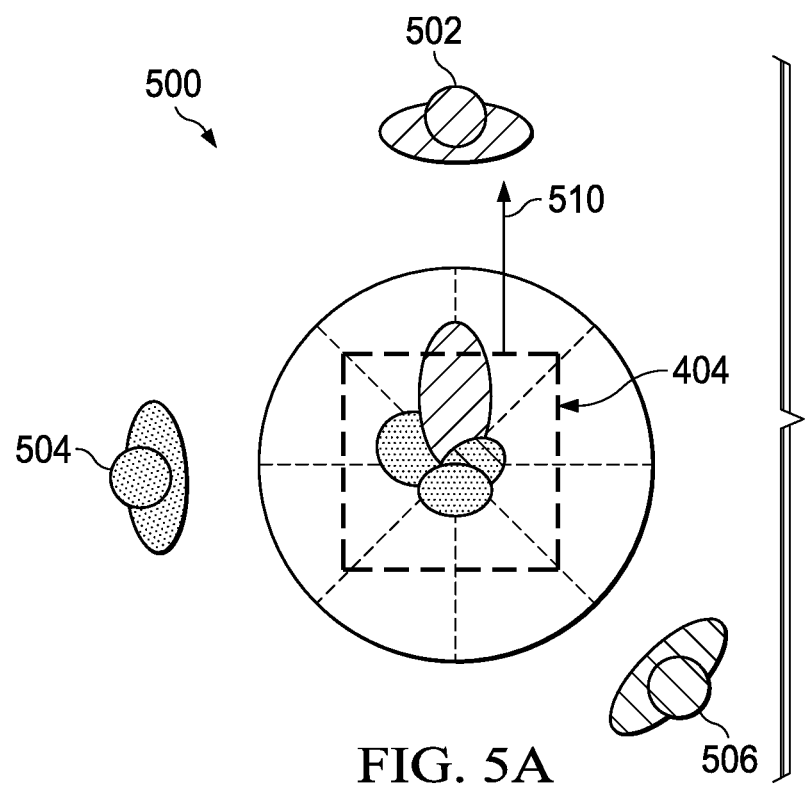
FIGS. 5A and 5B are diagrams illustrating example techniques of positioning a content capturing device based on a dominant sound source.
Figure 5B:
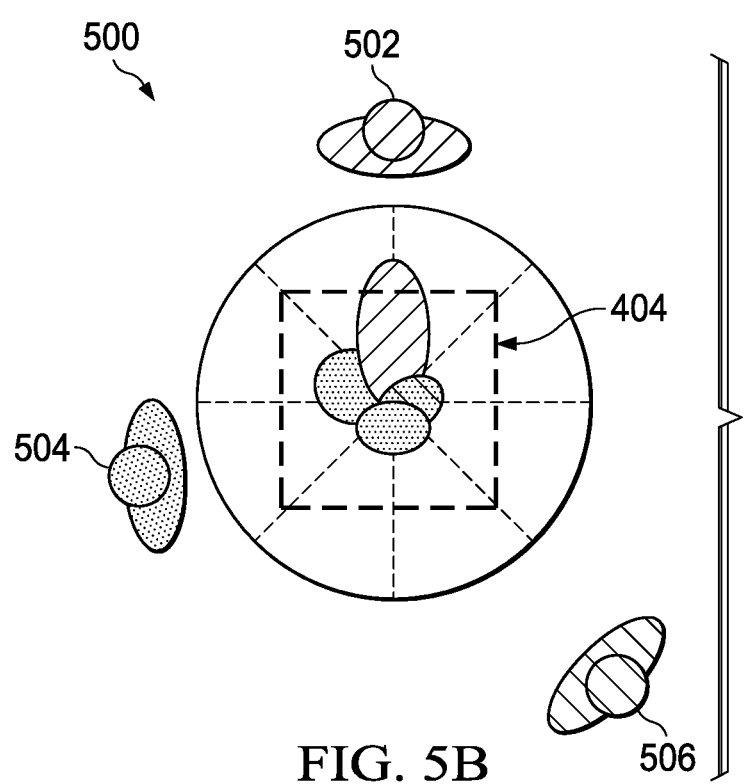

FIGS. 5A and 5B are diagrams illustrating example techniques of positioning a content capturing device based on a dominant sound source. In FIG. 5A, a controller, e.g., the controller 102 as described above, positions a recording device 404 at an initial location in a sound environment 500. In this example, the recording device 404 can include an audio capturing device that includes a microphone array. The microphone array includes multiple directional microphones that point to various directions. For convenience, in the example shown, the microphone array includes four directional microphones pointing to directions at zero, 90, 180, and 270 degrees, respectively, in a reference frame. Other arrangements are possible. The sound environment 500 can be, for example, a concert or conference, where sound sources 502, 504 and 506 take turns to generate sound at various times. The sound sources 502, 504 and 506 can be performers of the concert or speakers in the conference.

A content analyzer, e.g., the content analyzer 107 of FIG. 1A, can receive audio signals from the microphone array and determine attributes of a sound field of the sound environment 500. In the example shown, the content analyzer determines a respective level, measured as loudness, from each individual sound source 502, 504 and 506. The content analyzer compares the loudness of the signals from the directional microphones and optionally, applies facial recognition techniques of images captured by a video device. Based on the comparison and the facial recognition, the content analyzer determines that the sound source 502 is a dominant sound source, where a difference between a sound level, e.g., as measured by loudness, of the sound source 502 and sound levels of other sound sources 504 and 506 satisfies a threshold difference level.

In response to determining that the sound source 502 is a dominant sound source, the content analyzer can notify a controller of the recording device 404, e.g., the controller 102 as described above. The content analyzer can provide a direction of the sound source 502 (in this example, zero degrees) to the controller. The controller can determine a distance of movement, and direct the recording device 404 to move (510) along the direction toward the dominant sound source 502 by that distance. The distance can correspond to a value for increasing the level of the dominant sound source by X decibel (dB). As shown in FIG. 5B, after the movement, the recording device 404 will be positioned closer to the dominant sound source 502 than before. For example, the controller can move the recording device 404 until the content analyzer determines that the recording device 404 is sufficiently close to the dominating sound source to receive a clear signal.

In an example use case, the recording device 404 is deployed in a conference room where a video conference including audio feed is taking place. A group of people are in the conference room. The recording device 404 records audio and video of the conference for feeding to a remote site. The recording device 404 includes a UAV, or a railed, craned, dollied, wired or wireless device hovering over a conference table, carrying the microphone array and a video camera. Implementing the techniques described above, the recording device 404 can detect a person speaking in the conference room, fly to a position facing the speaking person, and pointing a microphone and video camera to the speaker. When the speaking person finishes speaking and a next person starts to speak, the recording device 404 can fly to the next person. Accordingly, the recording device 404 can maintain the highest recording quality for the audio and video feed.

In another example use case, the recording device 404 is deployed in a concert. A video camera records images and a microphone array records audio. Using face tracking, head tracking, or object tracking, a content analyzer can identify performers and objects of interest. Implementing the techniques as described above, the content analyzer can determine that, for example, a singer starts to sing. In response, the content analyzer can direct, through a controller, the recording device 404 to fly closer to the singer to improve audio recording quality.

Example Positioning Based on Cinematographic Requirements

Figure 6:
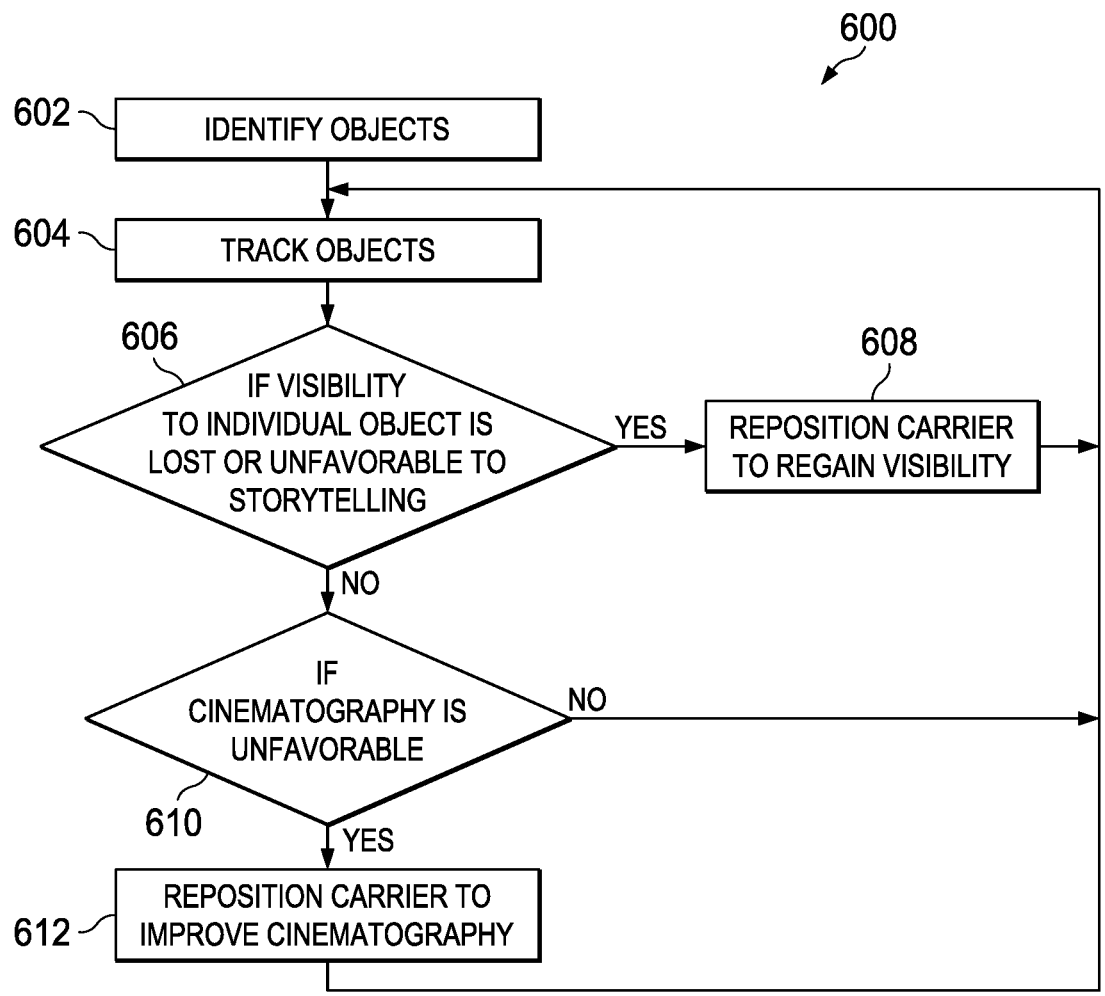
FIG. 6 is a flowchart of an example process of positioning a content capturing device based on visibility and cinematographic rules or other artistic motivations.

FIG. 6 is a flowchart of an example process 600 of positioning a content capturing device based on visibility and cinematographic rules or other artistic motivations. Process 600 can be performed by a system including one or more processors, e.g., the system 400 of FIG. 4.

The system can capture audio signals, video signals or both, from one or more content capturing devices of the system. The system identifies (602) one or more visual objects from the video signals based on the audio signals, video signals, or both. The system tracks (604) the visual objects. The system can track the visual objects by determining movement of the visual objects, including determining an original position and a new position of each of the visual objects.

The system determines (606) if visibility to an individual object is lost or becomes unfavorable to storytelling. The storytelling can be a set user specified or a computer estimated basic rules on what images are acceptable. The system can determine that the visibility of a visual object is lost when the visual object is blocked by another object due to movement. The system can determine that visibility of an object becomes unfavorable to storytelling upon determining, for example, due to lighting or distance, features of the visual object (e.g., facial features of a featured performer) cannot be distinguished in an image in a video stream.

In response to determining that visibility to an individual object is lost or becomes unfavorable to storytelling, the system repositions (608) a carrier of the content capturing devices to regain visibility. The system then continues to track (604) the objects after repositioning.

In response to determining that visibility to an individual object is not lost and is acceptable for storytelling, the system determines (610) if cinematography of the visual object becomes unfavorable. The system can make the determination based on one or more cinematographic rules. For example, the system can determine that cinematography of the visual object becomes unfavorable in response to determining that, due to movement of the object, that object appears too small, too dark, or too bright according to one or more threshold values specified in a rule specifying acceptable size and brightness limitations on the object.

In response to determining that cinematography is favorable for each tracked visual object, the system can continue tracking (604). In response to determining that cinematography is unfavorable for at least one tracked visual object, the system repositions (612) a carrier of the content capturing devices to improve cinematography. The system then continues to track (604) the object. By performing process 600, the system can automatically adjust video images and audio signals to adapt to movement of objects at an event without human intervention.

Figure 7A:
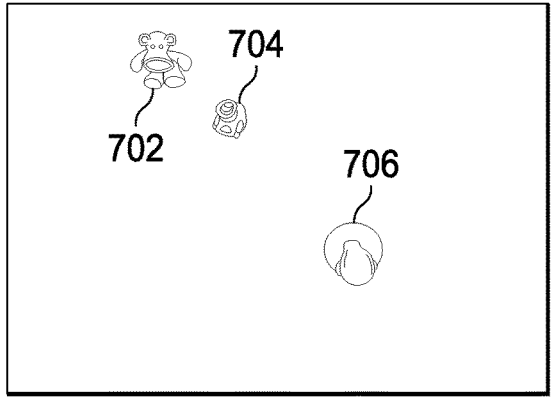
FIGS. 7A-7F are diagrams illustrating example techniques of positioning a content capturing device based on visibility and cinematographic rules.

FIGS. 7A-7F are diagrams illustrating example techniques of positioning a content capturing device based on visibility and cinematographic rules. FIG. 7A provides a top view of a scene where visual objects 702, 704 and 706 are present. A system, e.g., the system 400 of FIG. 4, is configured to capture still or motion digital images of the visual objects 702 using a content capturing device. A visibility rule can specify that all visual objects 702, 704 and 706 shall be visible in a digital image. The system is configured to enforce the visibility rule by automatically positioning the content capturing device. The visibility rule can be specified by a user input.

Figure 7B:
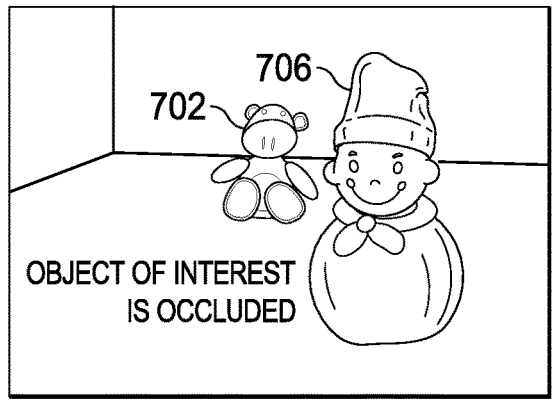

FIG. 7B is a digital image taken by the content capturing device of the visual objects at a first location. Through object tracking, a content analyzer of the system determines that only visual objects 702 and 706 are visible, and that the visual object 704 is occluded. Accordingly, the content analyzer can determine that a current position of the content capturing device violates the visibility rule.

Figure 7C:
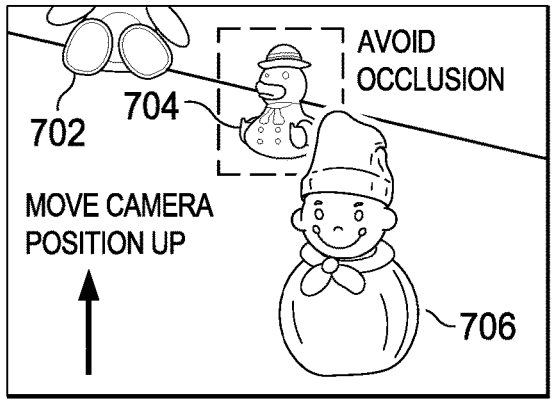

FIG. 7C illustrates a first response of the system provided as a result of determining the violation. The content analyzer can determine that by moving the content capturing device higher, the occlusion can be avoided. Accordingly, the content analyzer can instruct a controller to raise the content capturing device. The controller, in turn, can instruct a carrier of the content capturing device, e.g., a UAV, to increase altitude, e.g., by increasing a rotor speed, until the content analyzer determines that all visual objects 702 and 706 are visible. Upon determining that that all visual objects 702 and 706 are visible, the content analyzer can instruct the controller to stop raising the content capturing device.

Figure 7D:
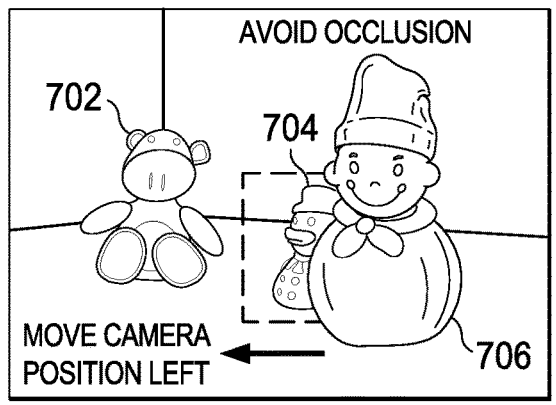

FIG. 7D illustrates a second response of the system provided as a result of the violation. The content analyzer can determine that by moving the content capturing device to the left, the occlusion can be avoided. Accordingly, the content analyzer can instruct a controller to move the content capturing device to the left. The controller, in turn, can instruct a carrier of the content capturing device, e.g., a UAV, to move to the left, for example, by adjusting one or more control surface actuators or to tilt a rotor.

The content analyzer can provide both raising the carrier or moving the carrier to the left as options to the controller. The controller can choose whether to apply the first response or second response based on various factors, including, for example, a pre-set preference on whether to increase altitude when possible, a limit in space that the carrier is permitted to use, or a current attribute of the carrier or the content capturing device. The attribute can include, for example, whether the content capturing device mounted on the carrier can point its lens up or down.

Figure 7E:
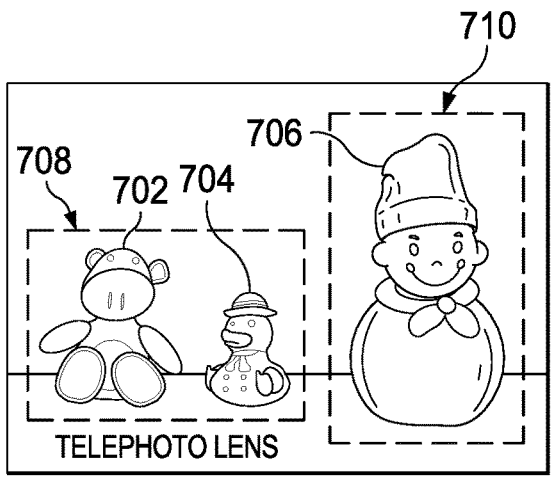
Figure 7F:
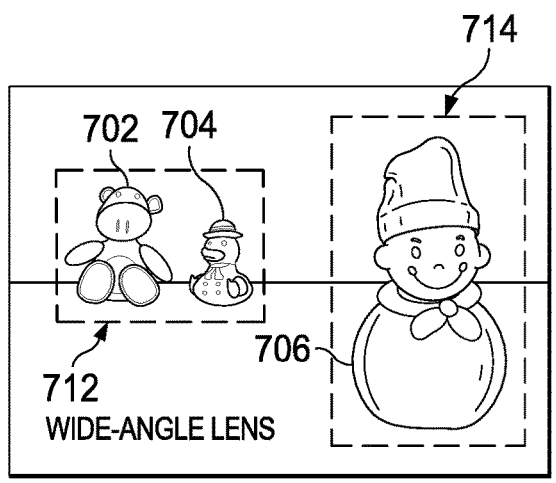

FIG. 7E is a digital image taken by the content capturing device of the visual objects at a second location. At the second location, the content capturing device uses a telephoto length to capture the visual objects 702, 704 and 706, where a proportion between the visual objects, as shown in boxes 718 and 710, is relatively uniform. FIG. 7F is a digital image taken by the content capturing device of the visual objects at a third location that is closer to the visual objects 702, 704 and 706 than the second location is. At the third location, the content capturing device uses a wide angle lens to capture the visual objects 702, 704 and 706, where a proportion between the visual objects, as shown in boxes 712 and 714, is relatively uneven as compared to FIG. 7E. The controller can choose between the second or third positions based on a cinematographic rule. The rule can specify, for example, a focal length of the lens, a degree of prominence of a visual object, e.g., the visual object 706, a degree of blurriness of the background, sometimes referred to as bokeh, which limits aperture choices which, in turn, may limit focal length choices, or any combination of the above. The controller can position the carrier to implement the rule. In some implementations, the content capturing device can be a computational imaging device including multiple cameras. Each of the cameras may have a respective focal length, lens type, sensitivity, etc. The devices can capture light fields, post-compute depth of the fields. The controller can position the carrier to position the computational imaging device at places for capturing the light fields.

Example Positioning Processes

Figure 8:
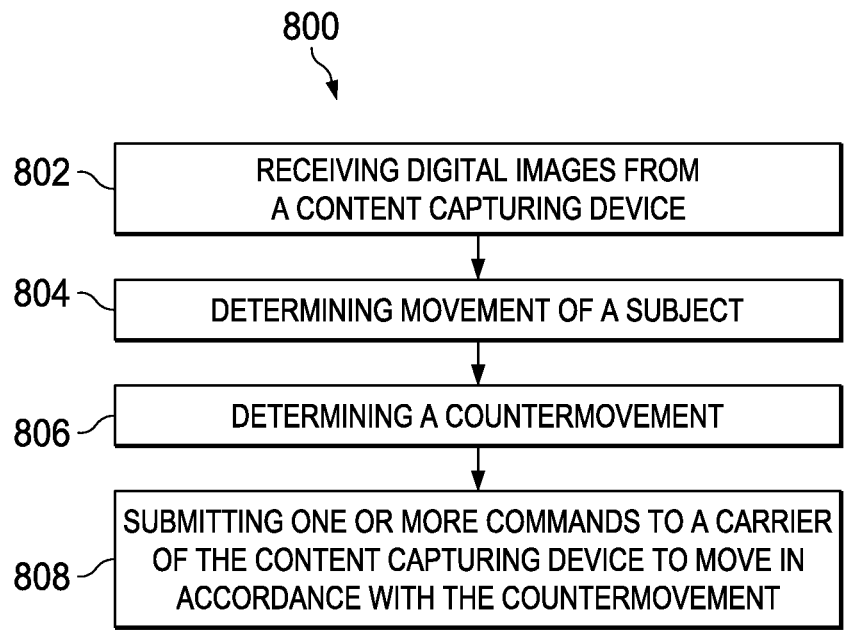
FIG. 8 is a flowchart of an example process of positioning a content capturing device based on movement of a subject.

FIG. 8 is a flowchart illustrating an example process 800 of positioning a content capturing device based on movement. The process 800 can be performed by a system including one or more processors, e.g., the system 400 of FIG. 4.

The system receives (802), from a content capturing device mounted on a carrier, a series of digital images of a subject and a background. The content capturing device can include a video or still image camera.

The system determines (804), from differences of the digital images, a movement of the subject relative to the background. The system can determine the movement using object-tracking techniques. In some implementations, the system can examine multiple available video streams from multiple content capturing devices and audio signals from respective microphones. The system can perform computer vision analysis including face and feature detection and tracking, occlusion detection, and event detection. The system can determine events including, for example, a singer starts or stops singing, a guitarist starts or stops playing, jumping up in the air, among others.

The system determines if the movement of the subject relative to the background triggers a countermovement. Upon determining that the movement triggers a countermovement, the system determines (806) a countermovement of the content capturing device that compensates for the movement of the subject to maintain visual characteristics of the subject in the digital images. The visual characteristics include a size, e.g., a proportion, of the subject as appeared in the digital images and an apparent focal length of a camera. Thus, for example, if the subject moves towards the camera, the countermovement can be backing off from the subject.

The system submits (808) one or more commands to the carrier of the content capturing device. The one or more commands can cause the carrier to move in accordance to the countermovement. The one or more commands can control a position of the content capturing device, e.g., in a three-dimensional reference frame, including directing the carrier, e.g., a UAV, to fly to that position. The one or more commands can include a command that is to be relayed to the content capturing device, e.g., a command for controlling a camera field of view by optically or digitally adjusting a focal length of the camera.

Figure 9:
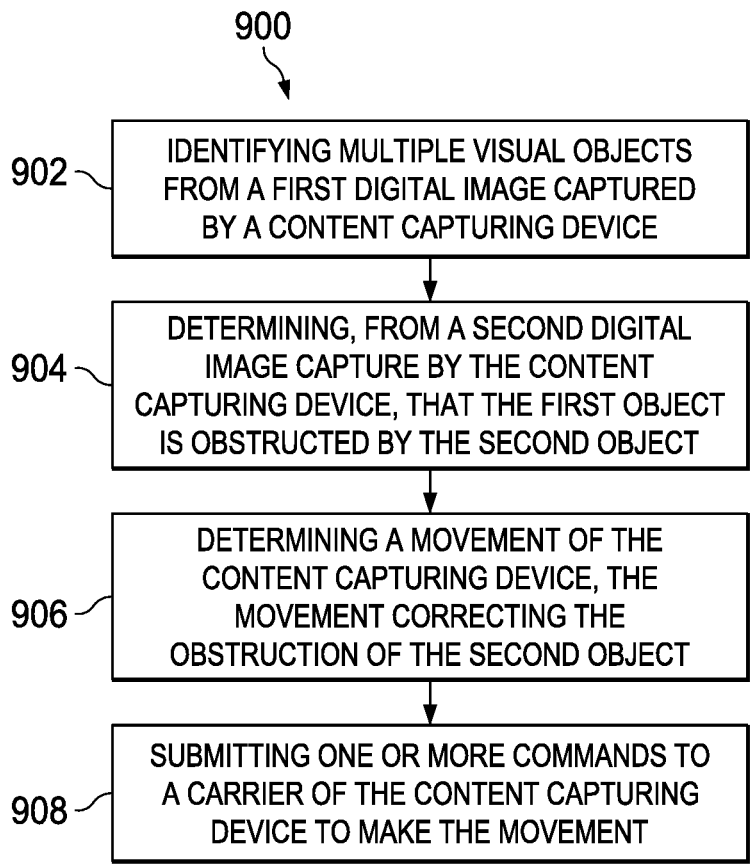
FIG. 9 is a flowchart of an example process of positioning a content capturing device based on visibility and cinematographic rules.

FIG. 9 is a flowchart illustrating an example process 900 of positioning a content capturing device based on visibility and cinematographic rules. The process 900 can be performed by a system including one or more processors, e.g., the system 400 of FIG. 4.

The system identifies (902), from a first digital image captured by a content capturing device mounted on a carrier, multiple individual visual objects including a first object and a second object. The content capturing device can include a video camera. Each of the first digital image and the second digital image is a still image or a frame in a video. The carrier can be a UAV.

The system determines (904), from a second digital image capture by the content capturing device, that the first object is obstructed by the second object. The obstruction can be caused by an initial position of the content capturing device, or by movement of the objects. The system can track a movement of the first object or the second object in reference to one or more stationary objects of the visual objects. The tracking can include providing a representation of the movement of the first object or the second object to an audio processing unit configured to detect sound objects based at least in part of positional information provided by the system. The audio processing unit can thus use visual information to assist sound field determination, including determining a respective position of each sound source that appears in a digital image.

The system determines (906) a movement of the content capturing device. The movement is a flight path of a UAV, the flight path being programmed to correct the obstruction of the second object. Determining the movement can include determining a target viewing position where the visual impairment is reduced or eliminated, and determining a motion path to the target viewing position. The motion path can be a path that is computed to avoid obstacles and to avoid blocking a viewer's view at scene. The motion path can be a path that is computed based on parameters specifying artistic requirements. Determining the target viewing position can be based on a digital or optical focal length of the camera device, a location of the first object or the second object, and one or more visibility rules or cinematographic rules specifying a weight of first object or the second object in digital images of the objects.

The system submits (908) one or more commands to the carrier of the content capturing device. The one or more commands can cause the carrier to move in accordance to the countermovement. The one or more commands include at least one of a navigation command operable to cause the UAV to move in a three-dimensional space surrounding the visual objects following the flight path or a set of coordinates in the three-dimensional space.

For example, the system can determine, based on one or more cinematographic rules specifying that the first object is to be emphasized, that the content capturing device shall move away from the first object while zooming in on the first object. In response, the system can submit, to the carrier, a first command instructing the carrier to move away from the first object. The system then submits, to the carrier or to the content capturing device, a second command instructing the content capturing device to increase focal length.

Figure 10:
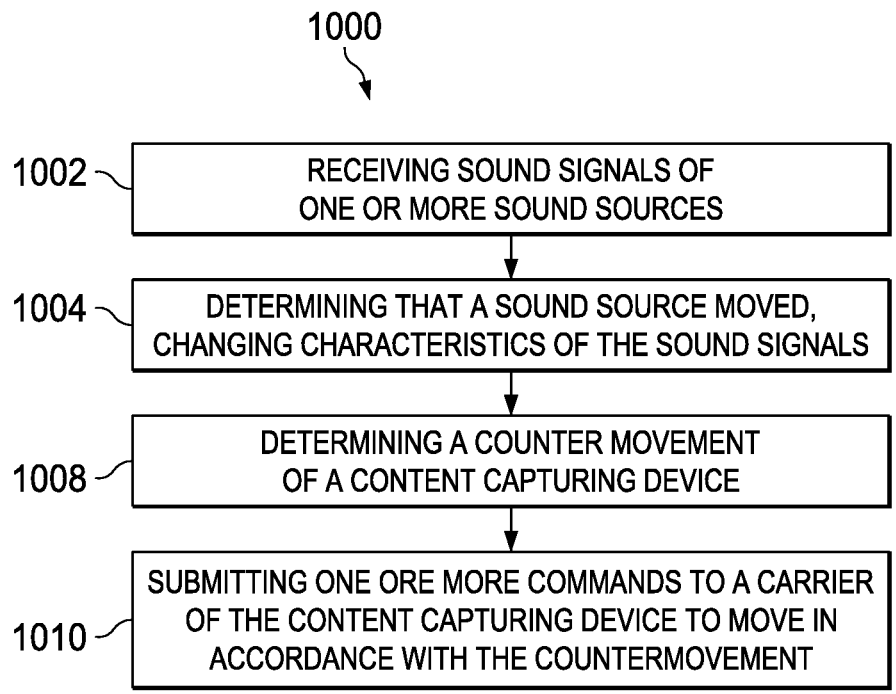
FIG. 10 is a flowchart of an example process of positioning a content capturing device based on movement of sound sources.

FIG. 10 is a flowchart of an example process 1000 of positioning a content capturing device based on movement of sound sources. The process 1000 can be performed by a system including one or more processors, e.g., the system 400 of FIG. 4.

The system receives (1002), from a content capturing device mounted on a carrier, audio signals of one or more sound sources, the audio signals having original characteristics. The content capturing device can include one or more microphones. The carrier can include a UAV. The sound sources can be performers at a concert, or speakers at a conference.

The system determines (1004), based on visual information or audio information, that a sound source of the one or more sound source moved, and that movement of the sound source changes characteristics of the audio signals. For example, from visual information captured by a camera, the system can determine that a keynote speaker at a conference is pacing from left to right on a stage, thereby changing a volume of recorded sound.

In response, system determines (1006) a counter movement of the content capturing device that maintains or restores the original characteristics of the audio signals. For example, the system can determine a movement of a microphone that follows movement of the pacing speaker, thereby maintains the volume.

The system submits (1008) one or more commands to the carrier of the content capturing device. The one or more commands cause the carrier to move in accordance to the counter movement. The one or more commands can include at least one of a navigation command operable to cause the UAV to move in a three-dimensional space or a set of coordinates in the three-dimensional space.

In some implementations, the system determines one or more sound objects from the audio signals. For example, the system can determine a first sound object corresponds to a first performer, a second sound object corresponds to a second performer and a third sound object corresponds to a third performer. The original characteristics can include relative locations of the one or more sound sources as represented by the one or more sound objects. For example, the system can determine that the first performer is on the front left, the second in the middle back, and the third on the front right. The relative locations represent a sound effect, in this example, a two-dimensional sound field where each performer has a perceived horizontal position and a depth, which is a perceived distance to a listener. Determining the counter movement in such cases includes determining a movement that maintains the sound effect. For example, the system can maintain the content capturing device in front of all performers rather than moving to a position among the performers, to avoid changing the sound effect to one where the perceived locations of the performers are behind the listener.

Figure 11:
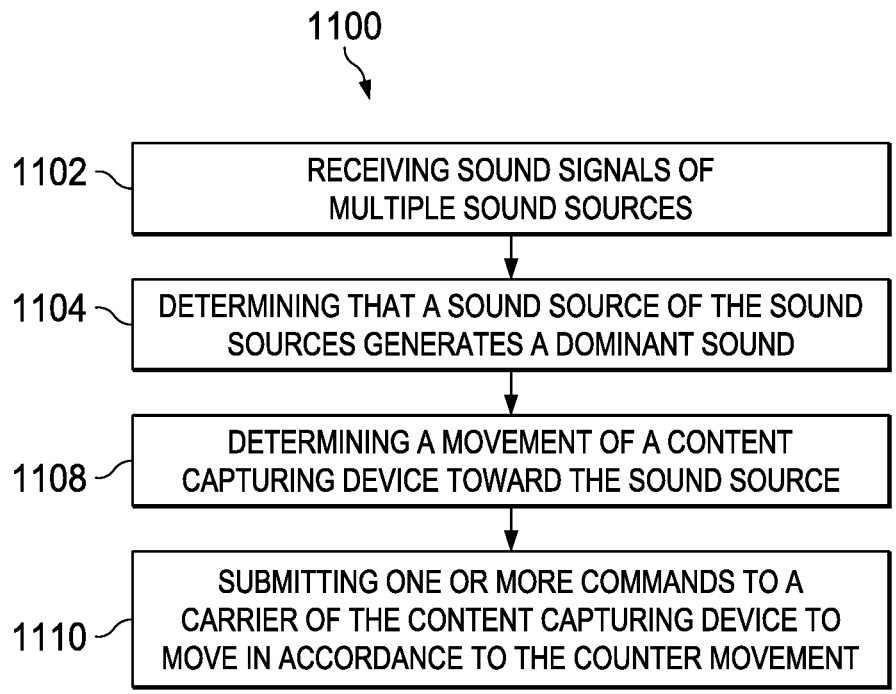
FIG. 11 is a flowchart of an example process of positioning a content capturing device based on a dominant sound source.

FIG. 11 is a flowchart of an example process 1100 of positioning a content capturing device based on a dominant sound source. The process 1200 can be performed by a system including one or more processors, e.g., the system 400 of FIG. 4.

The system receives (1102), from a content capturing device mounted on a carrier, audio signals of multiple sound sources. The carrier can include a UAV. The sound sources can be performers at a concert, or speakers at a conference. The content capturing device can include an array multiple directional microphones pointing at respective directions.

The system determines (1104), that a sound source of the sound sources is a dominant sound source. A dominant sound source can be a sound source that generates a sound that is louder by at least a threshold level over sound generated by each other sound source.

In response, system determines (1106) a movement of the content capturing device that is toward the dominant sound source. The movement can include pointing a microphone to the dominant sound source, moving a microphone closer to the dominant sound source, or both.

The system submits (1008) one or more commands to the carrier of the content capturing device. The one or more commands cause the carrier to make the movement. The one or more commands can include at least one of a navigation command operable to cause the UAV to move in a three-dimensional space or a set of coordinates in the three-dimensional space. The one or more commands can include a command to the UAV or to a camera device mounted on the UAV, the command operable to cause the camera device to point to the sound source and focus on the sound source.

Figure 15:
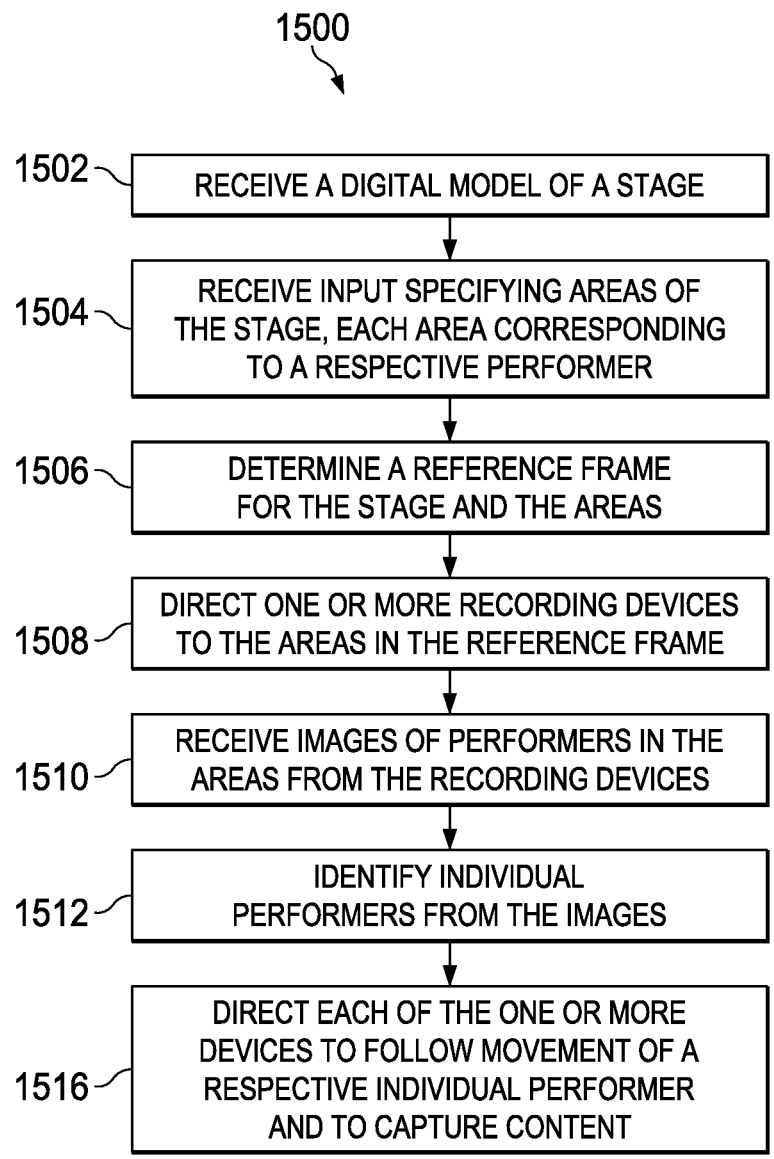
FIG. 15 is a flowchart of an example process of positioning a content capturing device based on a stage model.

FIG. 15 is a flowchart of an example process 1500 of positioning a content capturing device based on a stage model. The process 1200 can be performed by a system including one or more processors, e.g., the system 400 of FIG. 4.

The system can receive (1502) a digital model of a venue. The venue can be, for example, a recording studio, a conference room or a stage at a concert. The digital model can define a three-dimensional space around the stage using coordinates in a reference frame. A user input, e.g., a drawing on a touch-sensitive display surface, can provide the digital model. In some implementations, receiving the digital model includes capturing the digital of the venue, for example, via point cloud capture, photogrammetry, or any combination of the above. Accordingly, in these implementations, the system can create the digital model when the digital model does not preexist.

The system can receive (1504) an input specifying areas of the venue. Each area can correspond to a respective performer or speaker. For example, the system can receive an input defining a fixed position of a drummer, a bass player, and a space in which a guitarist or a singer is expected to move.

The system can determine (1506) a reference frame for the venue and for each of the areas. The reference frame can include coordinates of the space around the venue, and coordinates of a respective space for each area.

The system can direct (1508) one or more recording devices to the areas in the reference frame. For example, the system can instruct a first UAV carrying a first content capturing device to the position of the drummer, a second UAV carrying a second content capturing device to the position of the bass player, and a third UAV carrying a third content capturing device to the space in which the guitarist or singer is expected to move. The system can direct the UAVs to move to the respective areas by providing the coordinates to the recording devices and flight constraints, e.g., by avoiding obstacles or areas specified as no-fly areas. The system can direct the content capturing devices to capture video or still images, and/or audio.

The system can receive (1510) still or video images of performers in respective areas from the content capturing devices. Using facial or object recognition techniques, the system can identify (1512) individual performers or speakers from the received images. In some implementations, the identification can be aided by audio recognition.

The system can direct (1516) each of the one or more recording devices to follow movement of a respective individual performer and capture content. For example, the system can instruct the first UAV to remain at a vantage viewpoint of the position of the drummer, the second UAV to remain at a vantage viewpoint of the position of the bass player, and the third UAV follow the guitarist or singer. Thus, the process 1500 can achieve the technical advantage of automatically detecting and following performers or speakers based on input specifying where the performers are likely to be positioned or are likely to move to.

Audio Capture for an Aerial Device

Figure 16:
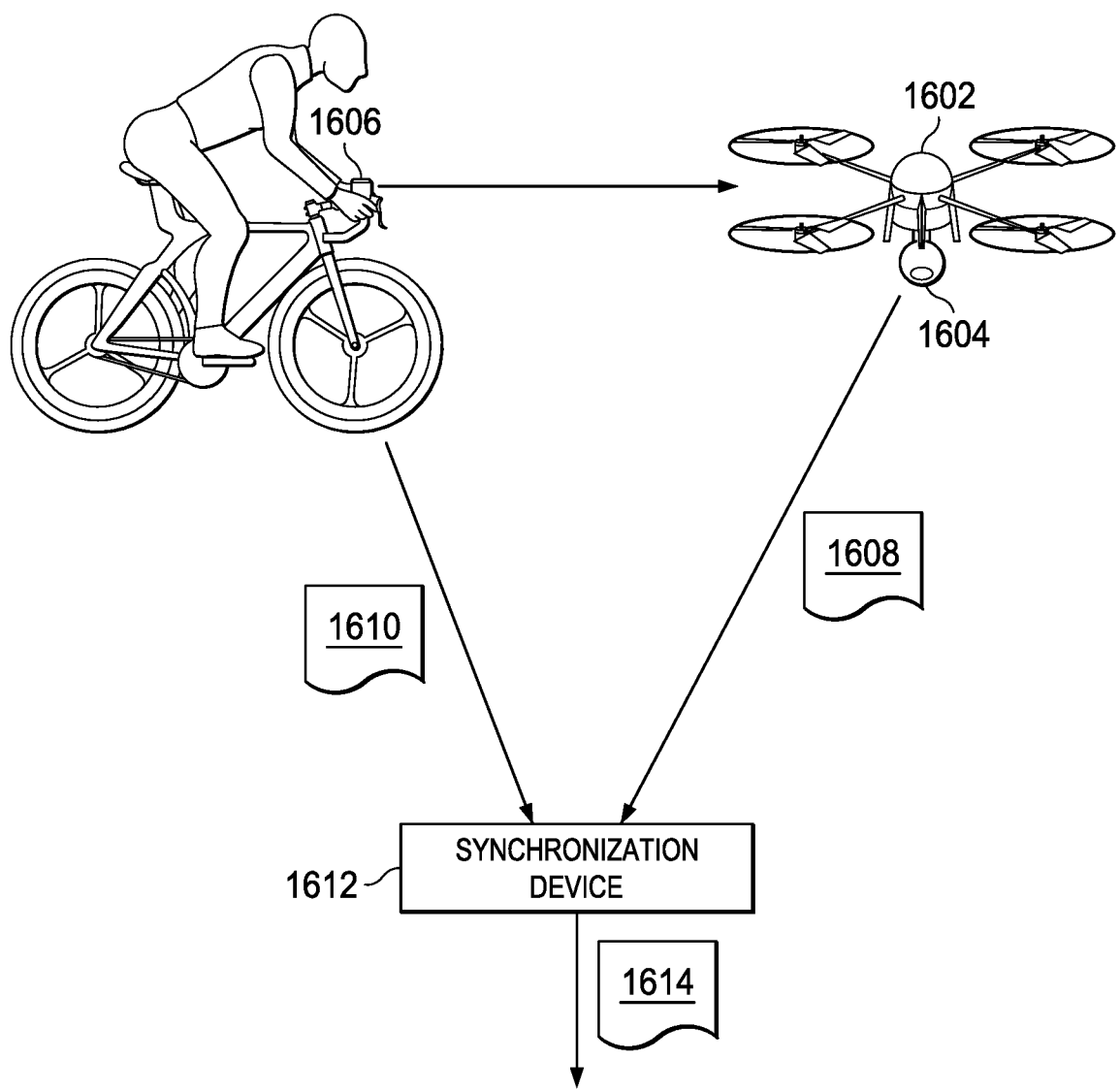
FIG. 16 is a diagram illustrating example techniques of audio capture for an aerial device.

FIG. 16 is a diagram illustrating example techniques of audio capture for an aerial device. An aerial device, e.g., a carrier 1602, carries a content capturing device 1604, e.g., a video camera. The carrier 1602 can be a UAV remotely controlled by a controller device 1606. The controller device 1606 can be a wearable device, e.g., a device having one or more computer processors that is mounted on an armband or a helmet. A user wears the controller device 1606 and moves around. For example, the user may ride a mountain bike going downhill.

The controller device 1606 can send out positional information, e.g., GPS coordinates, an RF beacon signal, or a light signal, that indicates a location of the controller device 1606. The carrier 1602 is configured to follow the controller device 1606 according to the positional information, e.g., by flying in the air following the RF beacon signal. While the carrier 1602 flies in the air, the content capturing device 1604 captures content and generates a first content recording 1608. For example, when the user rides the mountain bike, the carrier 1602 can fly in the air following movement of the user. The carrier 1602 can hover X meters above, behind, or on the side of the user. Meanwhile, the content capturing device 1604 can capture a video recording of the user riding the mountain bike. The controller device 1606 may be programmed to pre-specify a relative position of the carrier 1602 to the controller device 1606 and a zoom level of the video recording.

The controller device 1606 can include, or be coupled to, a second content capturing device, e.g., a voice recorder including a microphone. The second content capturing device is worn by, or otherwise mounted on, the user, and is closer to the user than the carrier 1602 is. The user may talk to the second content capturing device. For example, the user may describe bumps and obstacles on the downhill path or the speed at which the bike is descending. A triggering event causes the second content capture device to record the user's narratives. The triggering event can include, for example, a push on a "record" button, a particular gesture (e.g., a wave of hand when the controller device 1606 is worn on a wrist), or detection of sound by the second content capture device.

The triggering event can cause the controller device 1606 to send a first start synchronization signal to the carrier 1602. The first start synchronization signal can indicate a time that the second content capturing device starts recording. The first start synchronization signal can be an RF signal, or a light flash, e.g., a light in a particular color from an LED, that is detectable by the first content capturing device 1604. The first content capturing device 1604 can insert a representation of the first start synchronization signal into the first content recording 1608. The representation of the first start synchronization signal may be a digital signature that is imperceptible to human eyes in a video stream but detectable by a computer. The representation can be, for example, several pixels at various locations having certain values or a marker in metadata of the video.

Meanwhile, the second content capturing device can record the user's narratives, or other sound detected by the second content capturing device, into a second content recording 1610. At the time the controller device 1606 sends the first start synchronization signal to the carrier 1602, the controller device 1606 causes the second content capturing device to insert a second start synchronization signal into the second content recording 1610. The second start synchronization signal indicates a synchronization position with the first content recording. The second start synchronization signal can be a digital signature that is imperceptible to human ears but detectable by a computer. The second start synchronization signal can be, for example, a beep having a frequency that is above 20 kHz.

The first content capturing device 1604 and the second content capturing device can submit the first content recording 1608 and the second content recording 1610, respectively, to a synchronization device 1612. Submitting the first content recording 1608 and the second content recording 1610 can include streaming the first content recording 1608 and the second content recording 1610 to the synchronization device 1612 wirelessly or in one or more wired transmissions, either real time during recording or after the recordings are finished and the carrier 1602 landed. The synchronization device 1612 can be a mobile device, e.g., a smart phone carried by the user, or a server computer that includes one or more computer processors programmed to mix the first content recording 1608 and the second content recording 1610. Mixing the first content recording 1608 and the second content recording 1610 can include incorporating at least a portion of the second content recording 1610 into the first content recording 1608 to generate an output content recording 1614.

Mixing the first content recording 1608 and the second content recording 1610 includes temporally aligning the first content recording 1608 and the second content recording 1610 based on the start synchronization signals in each recording. The synchronization device 1612 can align the first content recording 1608 and the second content recording 1610 such that the positions of corresponding start synchronization signals match one another. The alignment can be performed automatically, or in response to a user input received through a user interface. An example user interface of the synchronization device 1612 is described in additional details below in reference to FIG. 17.

In some implementations, the second content capturing device can record multiple segments of second content recordings. For example, the narratives of the user can have several sections, and long pauses in between. To save battery, the second content capturing device can pause recording when the user is silent. Accordingly, a short, e.g., one minute second content recording may correspond to a longer, e.g., ten minutes of the first content recording. The synchronization device 1612 is configured to identify a respective second start synchronization signal for each section of the second content recording, and match each second start synchronization signal with a corresponding first start synchronization signal in the first content recording.

In some implementations, in addition to providing the first and second start synchronization signals, the controller device 1606 can generate corresponding first and second end synchronization signals. Internal clocks in the first content capturing device 1604 and the second content capturing device may not be perfectly aligned. Accordingly, long recordings may be out of synchronization even if they are temporally aligned at the beginning. For example, 1000 seconds of the first content recording 1608 may correspond to 999.9 or 1000.1 seconds of the second content recording 1610. The first content capturing device 1604 and the second content capturing device can insert a first end synchronization signal and a second end synchronization signal, respectively, into the first content recording 1608 and the second content recording 1610. The synchronization device 1212 can detect the positions of end synchronization signals, and lengthen or shorten one of the first content recording 1608 or the second content recording 1610, to align the start synchronization signals and to align the end synchronization signals.

The synchronization device 1612 is shown to be separate from the carrier 1602 and the controller device 1606. In some implementations, the synchronization device 1612 can be a component of the carrier 1602 or the controller device 1606. In some implementations, each of the carrier 1602 or the controller device 1606 can be a component of the synchronization device 1612.

Figure 17:
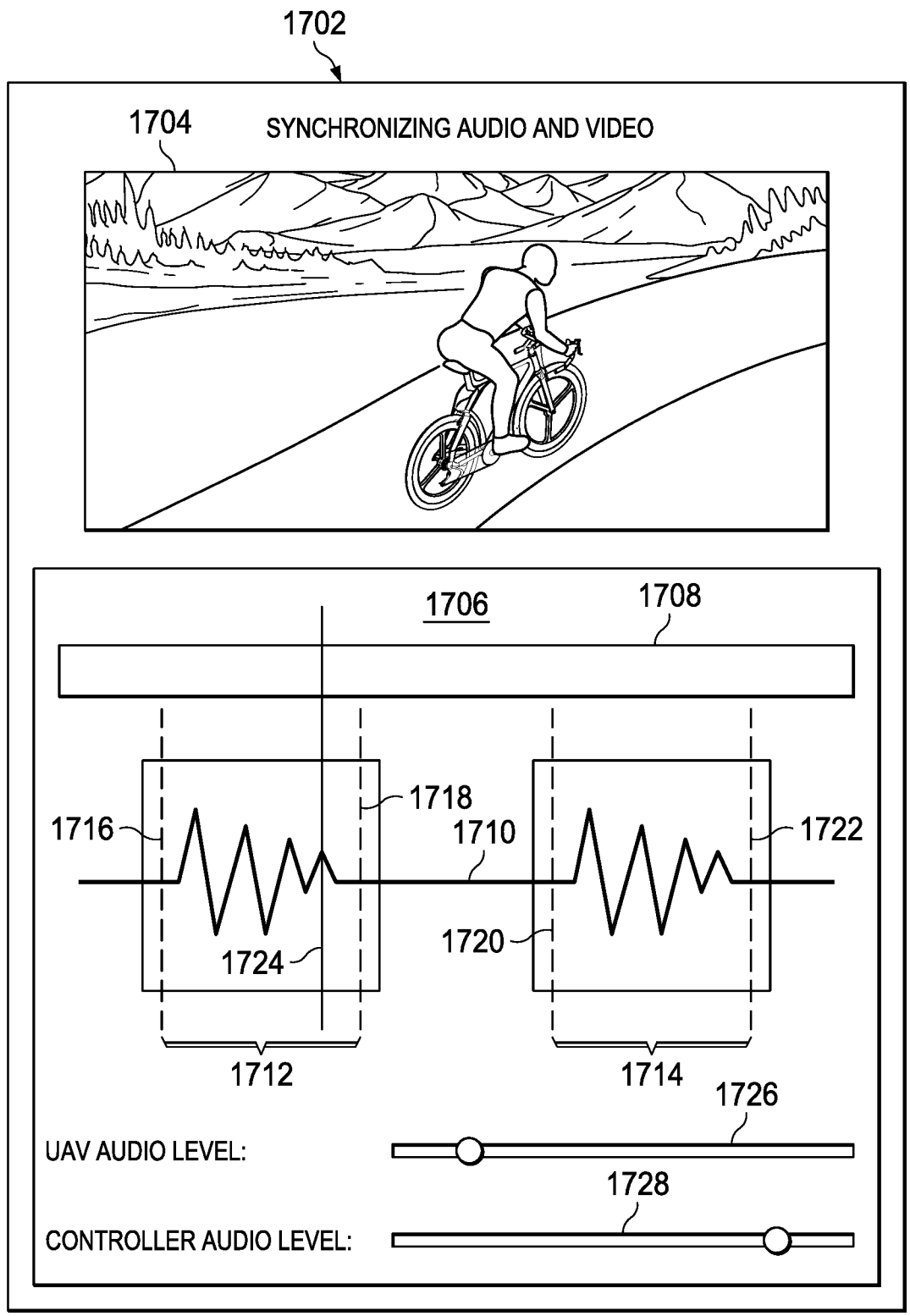
FIG. 17 illustrates an example user interface for audio capture for an aerial device.

FIG. 17 illustrates an example user interface 1702 for audio capture for an aerial device. The user interface 1702 can be presented by a synchronization device including one or more processors, e.g., the synchronization device 1612 of FIG. 16. For example, the user interface 1702 can be displayed on a display service of a smart phone. The synchronization device has received a first content recording, which can include a video recording. The synchronization device has received a second content recording, which can include an audio recording. The synchronization device has parsed the first content recording and the second content recording. The synchronization device has detected synchronization signals in the content recordings, and determined temporal locations of the synchronization signals.

The user interface 1702 includes a video display section 1704 configured to display a still image or a movie from the first content recording, which can be generated by a first content capturing device mounted on a carrier. The carrier can be a UAV following a controller device worn by a user. The first content capturing device can record video of the user. In some implementations, the first content capturing device can record ambient sound captured from a microphone onboard the carrier as well.

The user interface 1702 includes a mixing section 1706. The mixing section 1706 of the user interface 1702 can display a video bar 1708 that corresponds to the length of the first content recording. The mixing section 1706 of the user interface 1702 can display and audio waveform 1710 that corresponds to content in the second recording. The waveform 1710 can have one or more sections, e.g., sections 1712 and 1714, each of which is demarked by a respective start synchronization signal and a respective end synchronization signal. The sections 1712 and 1714 are temporally and visually aligned with corresponding periods of video in the first content recording. The alignment can be visualized by displayed markers 1716, 1718, 1720 and 1722. The markers are configured to receive user input moving the markers to fine tune, sometimes referred to as to lip sync, the alignments. A current frame marker 1724 can indicate a temporal position of a current frame played in the video display section 1704 in the video bar 1708.

The mixing section 1706 includes mixing controls 1726 and 1728. The mixing controls 1726 and 1728 can control a respective audio level of audio signals in the first content recording, if any, and audio signals in the second content recording. For clarity and convenience, only one control 1728 is shown for controlling the level of the audio signal from the second content recording. In various implementations, a UAV controller can be coupled to a stereo microphone, or multiple microphones recording multi-channel audio, e.g., audio that has front left, front right, center, surround left, surround right, and low frequency effects (LFE) channels. The synchronization device can determine an audio type indicating whether the audio is mono, stereo or multi-channel audio, and display multiple controls each corresponding to a respective channel.

The synchronizing device can receive input from the markers and the controls in the user interface 1702. The synchronizing device can then mix content in the first content recording and content in the second content recording to generate an output content recording. The output content recording can include video captured by a video camera carried by an UAV and audio captured by a microphone on the controller of the UAV. The synchronizing device can provide the output content recording for output on a presentation device, e.g., an A/V playback system, for streaming to a remote or local server, or for storage on a storage device.

Figure 18:
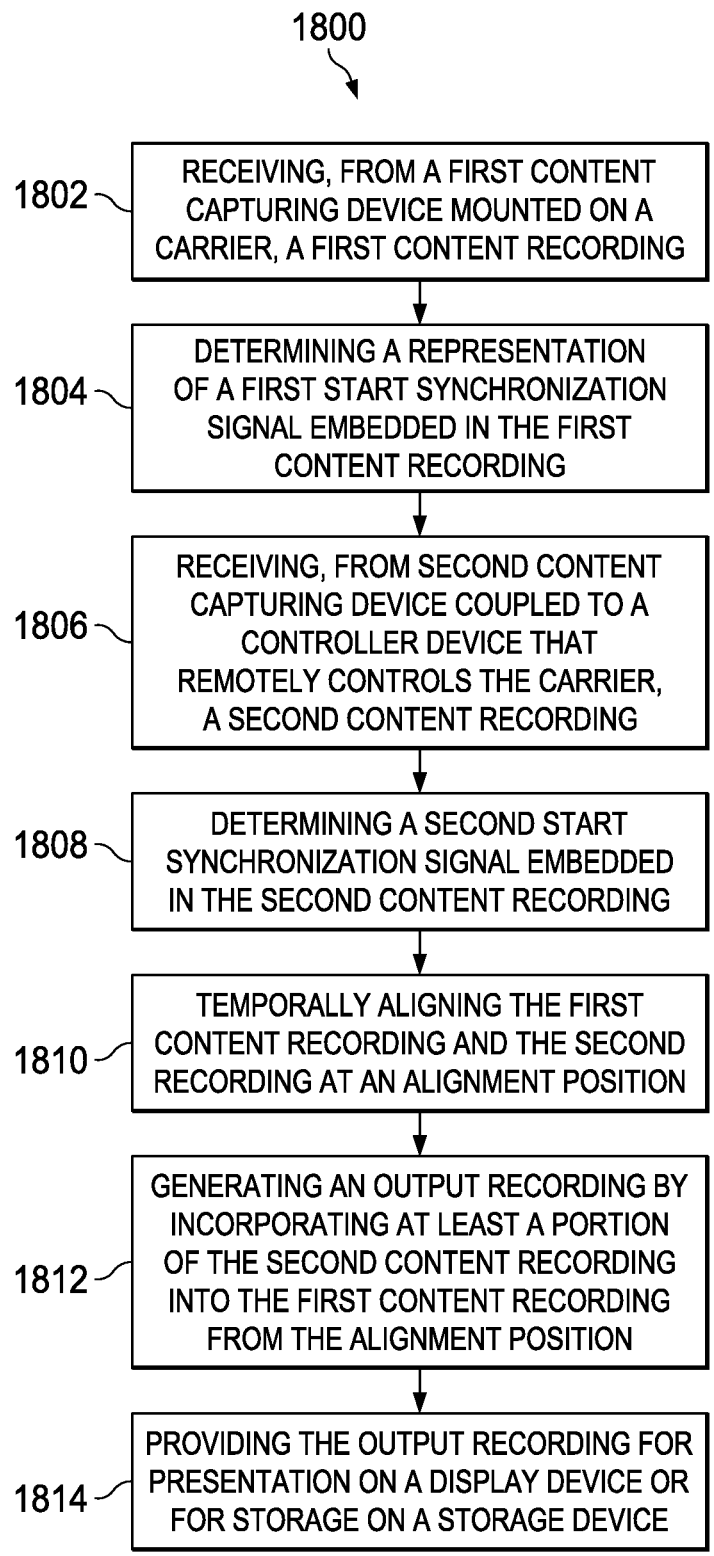
FIG. 18 is a flowchart illustrating an example process of synchronizing content from an aerial device and content from a controller of the aerial device.

FIG. 18 is a flowchart illustrating an example process 1800 of synchronizing content from an aerial device and from a controller. The process 1800 can be performed by a system including one or more computer processors, e.g., the synchronization device 1612 of FIG. 16.

The system receives (1802), from a first content capturing device mounted on a carrier, a first content recording. The first content capturing device can include a video recorder. The carrier can be an aerial device, e.g., a UAV. The first content recording can be a video stream transmitted from the first content capturing device or stored on a storage device, e.g., a non-volatile memory card. Receiving the first content recording can be real time or post production.

The system determines (1804) a representation of a first start synchronization signal embedded in the first content recording. The first start synchronization signal includes a flash or a radio frequency (RF) signal emitted by the controller device. Determining the first start synchronization signal can include scanning the first content recording by the system to locate the representation of the first start synchronization signal and determining a first temporal start position that corresponds to the representation of the first start synchronization signal. For example, the representation can be a series of pixels having certain values, or metadata that is invisible when the video is played. The system can determine the first temporal start position by determining a position of a signal in a bitstream.

The system receives (1806), from second content capturing device coupled to a controller device that remotely controls the carrier, a second content recording. The second content capturing device can include a sound recorder including a microphone. The controller device emits a guiding signal that causes the UAV to follow movement of the controller device. The second content recording can include an audio recording of a user carrying the controller device. The second content recording can be transmitted from the controller device or stored on a storage device, e.g., a non-volatile memory card. Receiving the second content recording can be real time or post production.

The system determines (1808) a representation of a second start synchronization signal embedded in the second content recording. The second start synchronization signal includes a sound signal generated by the controller device at the time the controller device emits the first start synchronization signal. Determining the representation of the second start synchronization signal can include scanning the second content recording to locate the representation of the second start synchronization signal and determining a second temporal start position that corresponds to the representation of the second start synchronization signal.

The system temporally aligns (1810) the first content recording and the second recording at an alignment position corresponding to the first start synchronization signal and the second start synchronization signal. Temporally aligning the first content recording and the second content recording can include temporally aligning the first temporal start position and the second temporal start position.

In some implementations, temporally aligning the first content recording and the second content recording includes the following operations. The system identifies a first temporal end position in the first content recording that corresponds to a first end signal that is transmitted from the controlling device to the carrier. The system identifies a second temporal end position in the second content recording that corresponds to a second end signal that is added by the controlling device to the second content recording.

The system generates (1812) an output recording by incorporating at least a portion of the second content recording into the first content recording from the alignment position. For example, the system can mix an audio recording into a video recording at a given sound level, for a particular period.

The system provides (1814) the output recording for presentation on a presentation device or for storage on a storage device. For example, the system can provide the output recording to a television with a screen and a sound system with one or more speakers for playback. The system can provide the output recording for streaming. The system can save the output recording to a disk or a memory card.

In some implementations, the system selects the first content recording from multiple first content recordings in response to a user input. For example, the system can select a video recording from multiple video recordings recorded by video cameras carried on multiple UAVs. The system selects the second content recording from multiple second content recordings using an identifier associated with the selected first content recording. For example, after the system selects the video recording, the system can automatically select an audio recording from a controller that controls the UAV that provided the video recording.

In some implementations, the system presents a user interface for incorporating the second content recording into the first content recording. The user interface can present time alignment information for temporally aligning the first content recording and the second content recording based on the first start synchronization signal and the second start synchronization signal. The user interface can include the example user interface 1702 described above in reference to FIG. 17. The system can receive a user input from the user interface. The user input can specify a level of the second content to be mixed into the first content. The system then incorporates the second content into the first content to generate the output content recording according to the user specified level.

Figures 19, 20:
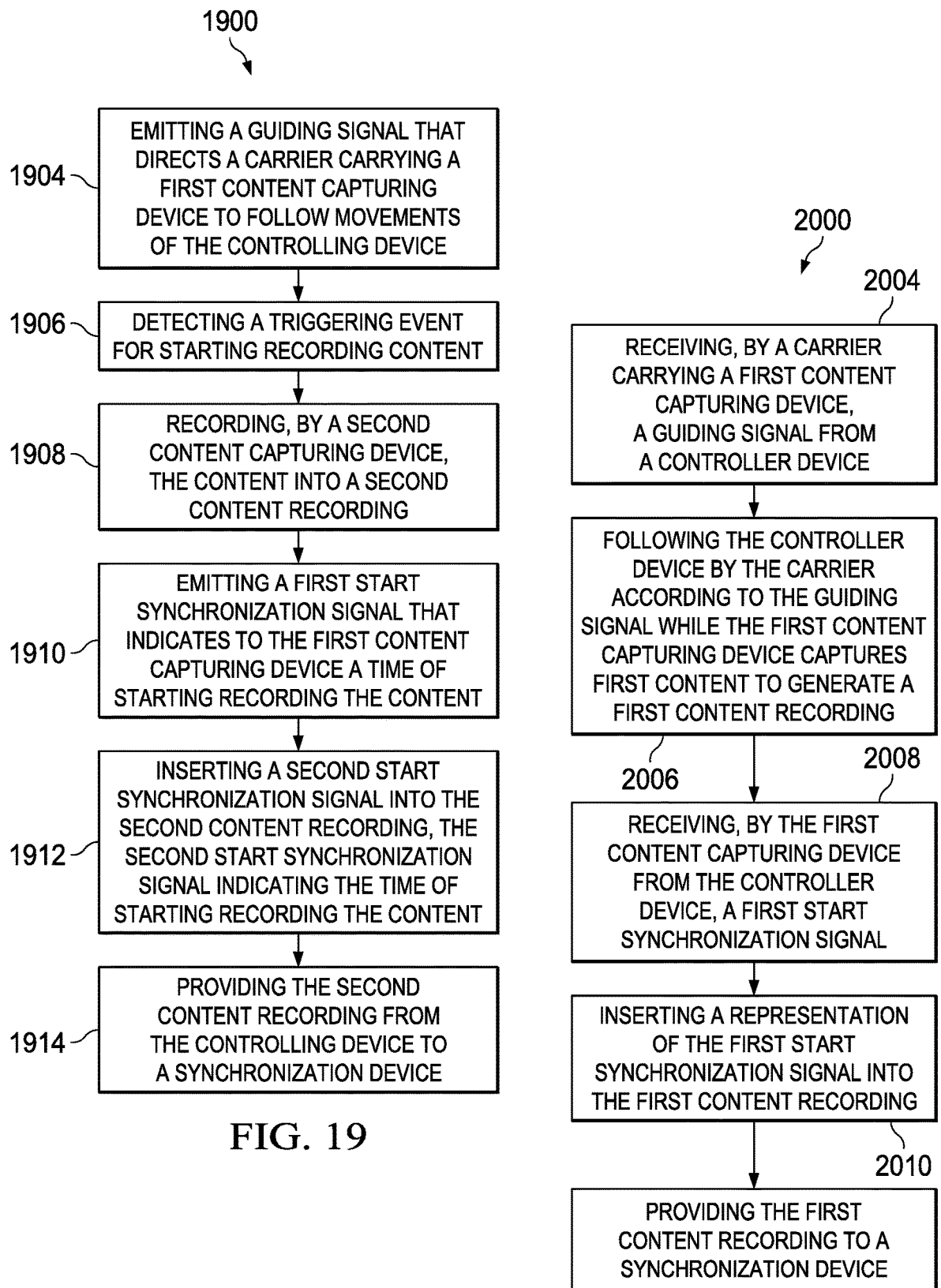
FIG. 19 is a flowchart illustrating an example process of audio capture for an aerial device performed by a controller of the aerial device.
FIG. 20 is a flowchart of an example process of audio capture for an aerial device performed by the aerial device.

FIG. 19 is a flowchart illustrating an example process 1900 of audio capture for an aerial device performed by a controller of the aerial device. The controller can include a device including one or more processors, e.g., the controller device 1606 of FIG. 16. The aerial device can include a carrier, e.g., the carrier 1602 of FIG. 16, carrying a content capturing device, e.g., the first content capturing device 1604 of FIG. 16.

The controller device emits (1904) a guiding signal that directs the carrier carrying the first content capturing device to follow movements of the controlling device. The first content capturing device is configured to generate a first content recording. The carrier can include a UAV. The first content capturing device can include a video recorder. The first content recording can include a video recording.

The controller device detects (1906) a triggering event for starting recording content. The triggering event can be a user pressing a start recording button. The triggering event can be an event where a user wearing or otherwise holding the controlling device starts talking, or when the user makes a certain gesture, e.g., waves a hand.

In response to the triggering event, a second content capturing device coupled to controller device records (1908) the content into a second content recording. The second content capturing device includes a microphone. The second content recording includes an audio recording associated with the video recording.

In addition, the controller device emits (1910) a first start synchronization signal that indicates to the first content capturing device a time of starting recording the content. The first start synchronization signal includes a flash or an RF signal.

The controller device inserts (1912) a representation of a second start synchronization signal into the second content recording. The second start synchronization signal indicates the time of starting recording the content. The second start synchronization signal can include a sound signal that is inaudible to human ears.

The controller device provides (1914) the second content recording to a synchronization device that is configured to synchronize the first content recording and the second content recording based on the first start synchronization signal and the second start synchronization signal. In some implementations, the synchronization device can be a component of the controller device.

In some implementations, the controller device can detect a triggering event for stopping recording the content by the second content capturing device. The triggering event can be a user pressing a stop recording button, or an event where the second content capturing device detects prolonged (e.g., over X seconds of) silence. In response, the controller device performs the following operations. The controller device emits a first stop synchronization signal that indicates to the first content capturing device a time of stopping recording the content into the second content recording. The controller device inserts a second stop synchronization signal into the second content recording. The second stop synchronization signal indicates the time of stopping the recording FIG. 20 is a flowchart an example process 2000 of audio capture for an aerial device performed by the aerial device. The aerial device can be system including a carrier carrying a content capturing device, e.g., the carrier 1602 of FIG. 16 carrying the first content capturing device 1604. The carrier can include a UAV including one or more processors.

The system receives (2004) a guiding signal from a controller device. The guiding signal can be an RF signal or a light signal that indicates a location of the controller device. In some implementations, the guiding signal can include geographic coordinates of the controller device. In some implementations, the guiding signal can include readings of and accelerometer and a compass that are coupled to the controller. In some implementations, the guiding signal can include an RF beacon that broadcasts continuously or periodically, e.g., every X seconds.

The system follows (2006) the controller device according to the guiding signal while the first content capturing device captures first content to generate a first content recording. Following the controller device can include flying in a path that is in parallel to a path of the controller device while maintaining a distance that is specified by the controller device and maintaining a height above the controller device that is specified by the controller device. The first content capturing device includes a video recorder. The system can point the video recorder to the direction of the controller device. The first content recording includes a video recording.

The system receives (2008) a first start synchronization signal indicating that a second content capturing device that is coupled to the controller device starts to record second content into a second content recording. The second content capturing device can include one or more microphones. The second content recording can include a single-channel, two-channel, or multi-channel audio recording. The first start synchronization signal can include an RF signal.

The system inserts (2010) a representation of the first start synchronization signal into the first content recording. The representation of the first start synchronization signal includes a flash or an invisible signature that is detectable by a synchronization device.

The system provides (2012) the first content recording to a synchronization device that is configured to synchronize the first content recording and the second content recording based on the first start synchronization signal and a second start synchronization signal in the second content recording. In some implementations, the synchronization device is a part of the system. For example, the synchronization device can include a processor on the UAV that has a user interface that can be displayed on a remote control device that wirelessly connects to the UAV.

Exemplary Recording Device Architecture

Figure 12:
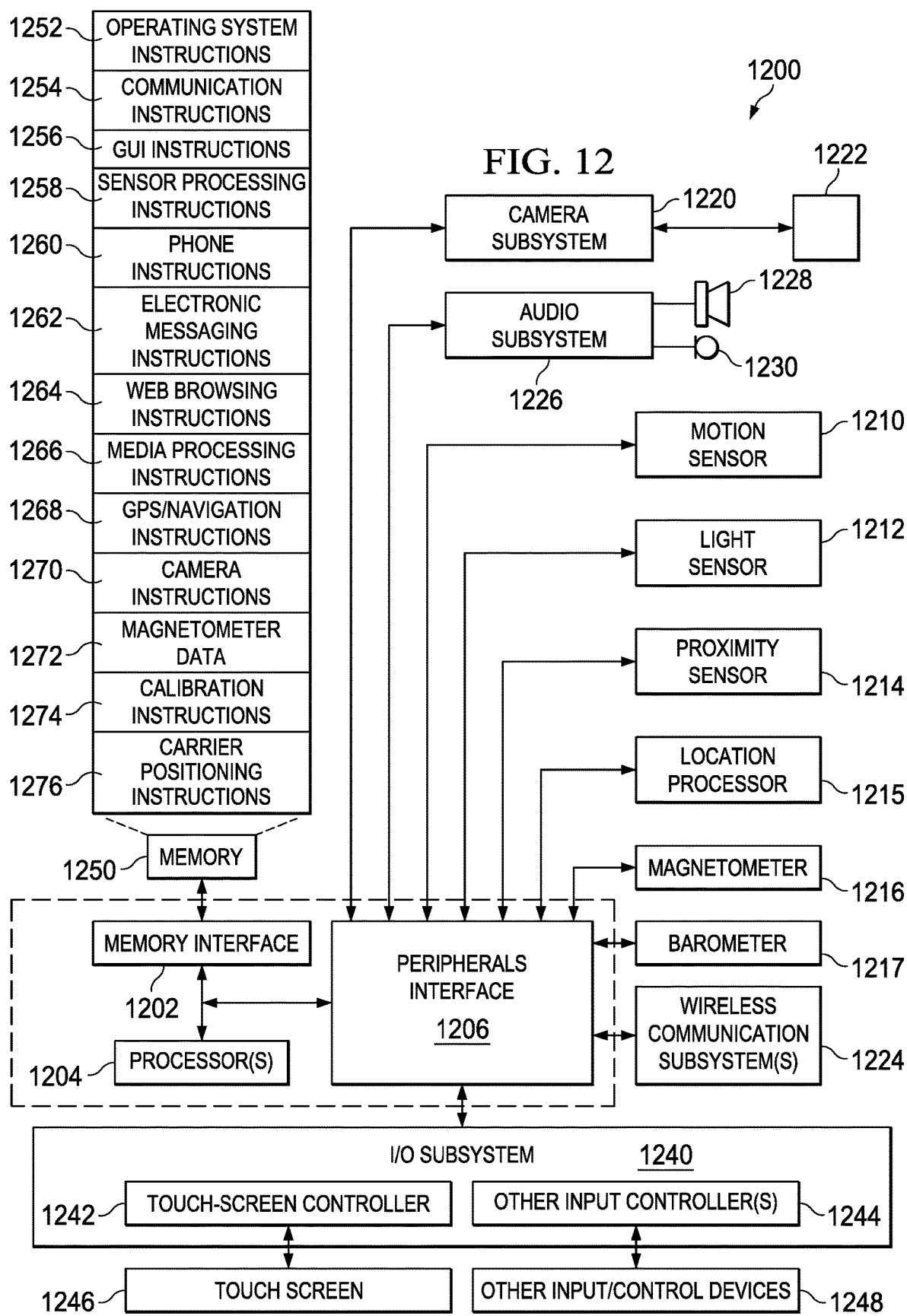
FIG. 12 is a block diagram illustrating an example device architecture of a mobile device implementing the features and operations described in reference to FIGS. 1-11 and 15.

FIG. 12 is a block diagram illustrating an exemplary device architecture 1200 of a device implementing the features and operations described in reference to FIGS. 1-11 and 15-20. The device can include, for example, the controller 102 of FIG. 1A, the content analyzer 107 of FIG. 1A, or both. The device can include memory interface 1202, one or more data processors, image processors and/or processors 1204 and peripherals interface 1206. Memory interface 1202, one or more processors 1204 and/or peripherals interface 1206 can be separate components or can be integrated in one or more integrated circuits. Processors 1204 can include application processors, baseband processors and wireless processors. The various components in the mobile device, for example, can be coupled by one or more communication buses or signal lines.

Sensors, devices and subsystems can be coupled to peripherals interface 1206 to facilitate multiple functionalities. For example, motion sensor 1210, light sensor 1212 and proximity sensor 1214 can be coupled to peripherals interface 1206 to facilitate orientation, lighting and proximity functions of the mobile device. Location processor 1215 can be connected to peripherals interface 1206 to provide geopositioning. In some implementations, location processor 1215 can be programmed to perform the operations of a GNSS receiver. Electronic magnetometer 1216 (e.g., an integrated circuit chip) can also be connected to peripherals interface 1206 to provide data that can be used to determine the direction of magnetic North. Thus, electronic magnetometer 1216 can be used as an electronic compass. Motion sensor 1210 can include one or more accelerometers configured to determine change of speed and direction of movement of the mobile device. Barometer 1217 can include one or more devices connected to peripherals interface 1206 and configured to measure pressure of atmosphere around the mobile device.

Camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network (s) over which a mobile device is intended to operate. For example, a mobile device can include communication subsystems 1224 designed to operate over a GSM network, a GPRS network, an EDGE network, a Wi-Fi™ or WiMax™ network and a Bluetooth™ network. In particular, the wireless communication subsystems 1224 can include hosting protocols such that the mobile device can be configured as a base station for other wireless devices.

Audio subsystem 1226 can be coupled to a speaker 1228 and a microphone 1230 to facilitate voice-enabled functions, such as voice recognition, voice replication, digital recording and telephony functions. Audio subsystem 1226 can be configured to receive voice commands from the user.

I/O subsystem 1240 can include touch surface controller 1242 and/or other input controller(s) 1244. Touch surface controller 1242 can be coupled to a touch surface 1246 or pad. Touch surface 1246 and touch surface controller 1242 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1246. Touch surface 1246 can include, for example, a touch screen.

Other input controller(s) 1244 can be coupled to other input/control devices 1248, such as one or more buttons, rocker switches, thumb-wheel, infrared port, USB port and/or a pointer device such as a stylus. The one or more buttons (not shown) can include an up/down button for volume control of speaker 1228 and/or microphone 1230.

In one implementation, a pressing of the button for a first duration may disengage a lock of the touch surface 1246; and a pressing of the button for a second duration that is longer than the first duration may turn power to the mobile device on or off. The user may be able to customize a functionality of one or more of the buttons. The touch surface 1246 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 1202 can be coupled to memory 1250. Memory 1250 can include high-speed random access memory and/or non-volatile memory, such as one or more magnetic disk storage devices, one or more optical storage devices and/or flash memory (e.g., NAND, NOR). Memory 1250 can store operating system 1252, such as Android, iOS, Darwin, RTXC, LINUX, UNIX, OS X, WINDOWS, or an embedded operating system such as VxWorks. Operating system 1252 may include instructions for handling basic system services and for performing hardware dependent tasks. In some implementations, operating system 1252 can include a kernel (e.g., UNIX kernel).

Memory 1250 may also store communication instructions 1254 to facilitate communicating with one or more additional devices, one or more computers and/or one or more servers. Memory 1250 may include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Location instructions 1268 to facilitate generic GNSS and location-related processes and instructions; camera instructions 1270 to facilitate camera-related processes and functions; magnetometer data 1272 and calibration instructions 1274 to facilitate magnetometer calibration. The memory 1250 may also store other software instructions (not shown), such as security instructions, web video instructions to facilitate web video-related processes and functions and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1250. Memory 1250 can store carrier positioning instructions 1276 that, when executed by processor 1204, can cause processor 1204 to perform various operations including, for example, receiving signals from a content capturing device, determining a movement of the content capturing device, and generating one or more command to move a carrier of the content capturing device accordingly. In some implementations, the carrier positioning instructions 1276 can include instructions that, when executed by processor 1204, can cause processor 1204 to analyze the signals and to track audio or visual objects represented in the signals as described above in reference to the content analyzer 107. In some implementations, the carrier positioning instructions 1276 can include instructions that, when executed by processor 1204, can cause processor 1204 to perform operations of a controller device, e.g., the controller device 1606 as described in reference to FIG. 16 and optionally, the operations of a synchronization device, e.g., the synchronization device 1612 of FIG. 16.

Each of the above identified instructions and applications can correspond to a set of instructions for performing one or more functions described above. These instructions need not be implemented as separate software programs, procedures, or modules. Memory 1250 can include additional instructions or fewer instructions. Furthermore, various functions of the mobile device may be implemented in hardware and/or in software, including in one or more signal processing and/or application specific integrated circuits.

Figure 13:
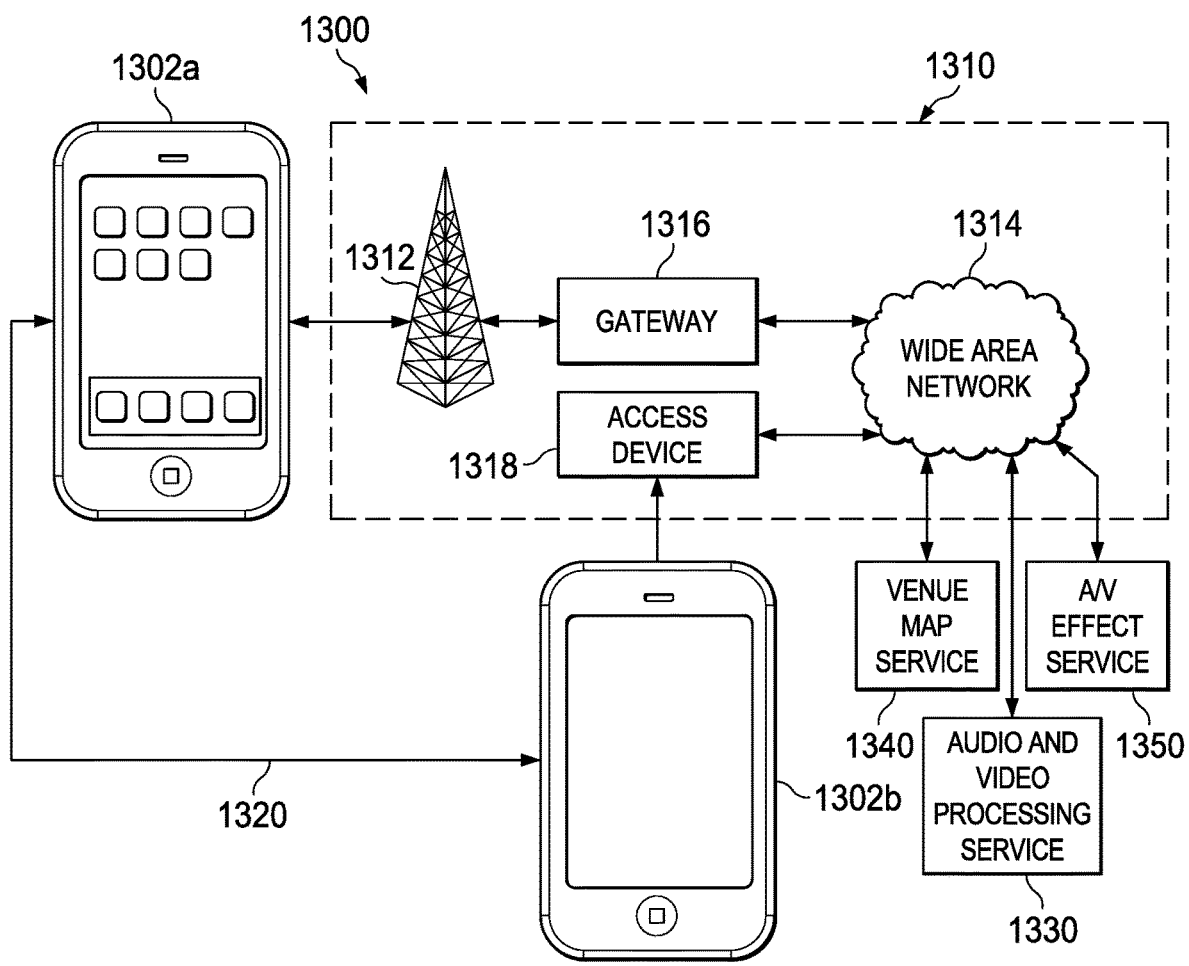
FIG. 13 is a block diagram of an example network operating environment for the mobile devices of FIGS. 1-11 and 15-20.

FIG. 13 is a block diagram of an example network operating environment 1300 for the devices of FIGS. 1-12 and 15-20. Devices 1302a and 1302b can, for example, communicate over one or more wired and/or wireless networks 1310 in data communication. For example, a wireless network 1107, e.g., a cellular network, can communicate with a wide area network (WAN) 1314, such as the Internet, by use of a gateway 1316. Likewise, an access device 1318, such as an 802.11g wireless access point, can provide communication access to the wide area network 1314. Each of devices 1302a and 1302b can a device having an architecture 1200 of FIG. 12.

In some implementations, both voice and data communications can be established over wireless network 1107 and the access device 1318. For example, device 1302a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1312, gateway 1316, and wide area network 1314 (e.g., using Transmission Control Protocol/Internet Protocol (TCP/IP) or User Datagram Protocol (UDP)). Likewise, in some implementations, the device 1302b can place and receive phone calls, send and receive e-mail messages, and retrieve electronic documents over the access device 1318 and the wide area network 1314. In some implementations, device 1302*a* or 1302*b* can be physically connected to the access device 1318 using one or more cables and the access device 1318 can be a personal computer. In this configuration, device 1302*a* or 1302*b* can be referred to as a "tethered" device.

Devices 1302*a* and 1302*b* can also establish communications by other means. For example, wireless device 1302*a* can communicate with other wireless devices, e.g., other mobile devices, cell phones, etc., over the wireless network 1107. Likewise, devices 1302*a* and 1302*b* can establish peer-to-peer communications 1320, e.g., a personal area network, by use of one or more communication subsystems, such as the Bluetooth™ communication devices. Other communication protocols and topologies can also be implemented.

The device 1302*a* or 1302*b* can, for example, communicate with one or more services 1330, 1340 and 1350 over the one or more wired and/or wireless networks. For example, one or more audio and video processing services 1330 can provide services of audio processing including object recognition and tracking, as described above. Venue map service 1340 can provide one or more maps of venues where a concert, conference, or other event occur. The maps can specify dimensions on space of the event, which a controller to determine a reference frame and a limit on where an UAV can move. The dimensions can be used to limit flight parameters of a UAV. Audio/visual effect service 1350 can provide one or more default and user customizable rules for recording audio and video. The rules can include visibility rules and cinematographic rules as described above.

Device 1302*a* or 1302*b* can also access other data and content over the one or more wired and/or wireless networks. For example, content publishers, such as news sites, Really Simple Syndication (RSS) feeds, web sites, blogs, social networking sites, developer networks, etc., can be accessed by device 1302*a* or 1302*b*. Such access can be provided by invocation of a web browsing function or application (e.g., a browser) in response to a user touching, for example, a Web object.

Example System Architecture

Figure 14:
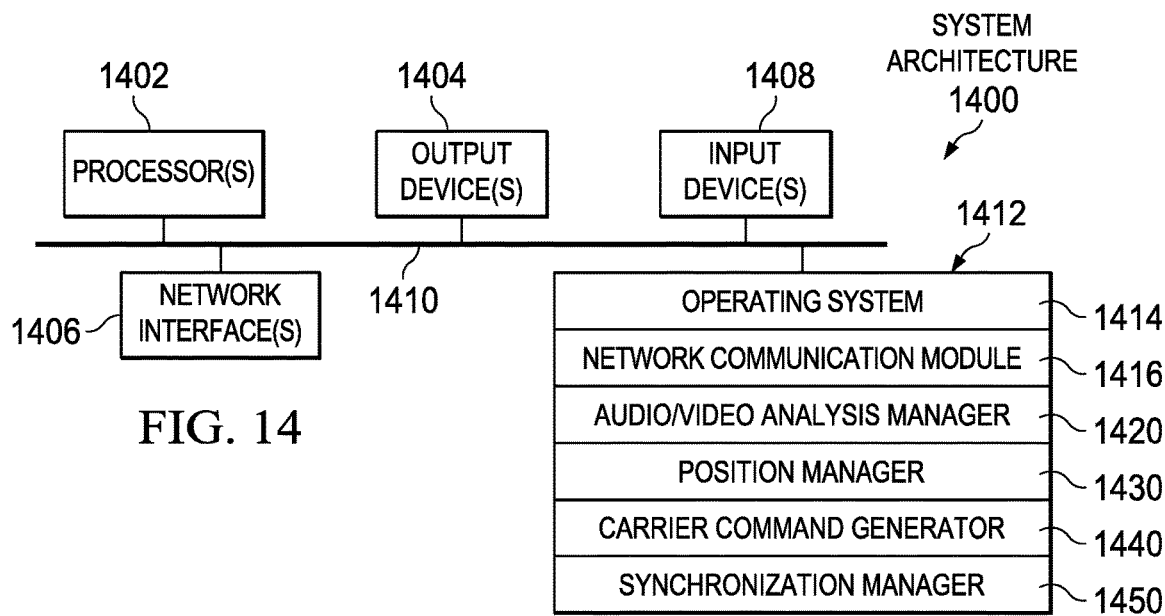
FIG. 14 is a block diagram of an example system architecture for a server system implementing the features and operations described in reference to FIGS. 1-11 and 15-20.

FIG. 14 is a block diagram of a system architecture for example server implementing the features and operations described in reference to FIGS. 1-11 and 15-20. Other architectures are possible, including architectures with more or fewer components. In some implementations, architecture 1400 includes one or more processors 1402 (e.g., dual-core Intel® Xeon® Processors), one or more output devices 1404 (e.g., LCD), one or more network interfaces 1406, one or more input devices 1408 (e.g., mouse, keyboard, touch-sensitive display) and one or more computer-readable mediums 1412 (e.g., RAM, ROM, SDRAM, hard disk, optical disk, flash memory, etc.). These components can exchange communications and data over one or more communication channels 1410 (e.g., buses), which can utilize various hardware and software for facilitating the transfer of data and control signals between components.

The term "computer-readable medium" refers to a medium that participates in providing instructions to processor 1402 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1412 can further include operating system 1414 (e.g., a Linux® operating system), network communication module 1416, audio/video analysis manager 1420, position manager 1430, carrier command generator 1440, and synchronization manager 1450. Operating system 1414 can be multi-user, multiprocessing, multitasking, multithreading, real time, etc. Operating system 1414 performs basic tasks, including but not limited to: recognizing input from and providing output to network interfaces 1406 and/or devices 1408; keeping track and managing files and directories on computer-readable mediums 1412 (e.g., memory or a storage device); controlling peripheral devices; and managing traffic on the one or more communication channels 1410. Network communications module 1416 includes various components for establishing and maintaining network connections (e.g., software for implementing communication protocols, such as TCP/IP, HTTP, etc.).

The audio/video analysis manager 1420 can include computer instructions that, when executed, cause processor 1402 to perform operations of analyzing audio and video data as described above, e.g., in reference to content analyzer 107 of FIG. 1A, as well as object recognition and tracking operations. Position manager 1430 can include computer instructions that, when executed, cause processor 1402 to perform operations of determining a position of a content capturing device based on one or more rules. Carrier command generator 1440 can include computer instructions that, when executed, cause processor 1402 to perform operations of determining a flight path based on the position and based on one or more constraints, e.g., ceiling height, viewer line of view blocking, walls around stages, as provided in a venue map. Synchronization manager 1450 can include computer instructions that, when executed, cause processor 1402 to perform operations of a synchronization device, e.g., the synchronization device 1612 as described in reference to FIG. 16 and optionally, operations of a controller device, e.g., the controller device 1606 as described in reference to FIG. 16.

Architecture 1400 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   receiving, by one or more processors from a content capturing device mounted on a carrier, video images of a subject;
   receiving, by the one or more processors, audio signals associated with the subject and at least one other subject;
   determining, by the one or more processors based at least in part on the video images, a movement of the subject;
   determining, by the one or more processors, a counter movement of the content capturing device that corresponds to the movement of the subject and maintains or restores a balanced sound level of the audio signals; and
   submitting, by the one or more processors to the carrier, one or more commands, the one or more commands causing the carrier to move in accordance with the movement of the content capturing device.

2. The method of claim 1, wherein:
   the carrier includes an unmanned aerial vehicle (UAV),
   the movement of the content capturing device is represented as a flight path of the UAV,
   the content capturing device includes a video camera, and
   the video images includes at least one of still digital images or motion videos.

3. The method of claim 1, wherein determining the movement of the content capturing device comprises determining a movement that compensates for the movement of the subject to maintain visual characteristics of the subject in the video images.

4. The method of claim 1, wherein determining the movement of the content capturing device comprises:

identifying, by the one or more processors from a first image of the video images, a plurality of individual visual objects including the subject and a first object;

determining, by the one or more processors from a second image of the video images, that the subject is visually obstructed by the first object; and determining, by the one or more processors, the movement of the content capturing device that corrects visual obstruction of the subject.

5. The method of claim 4, wherein determining the movement of the content capturing device that corrects the visual obstruction of the subject comprises:

determining a target viewing position where the visual obstruction is reduced or eliminated; and determining a motion path of the carrier to the target viewing position.

6. The method of claim 5, wherein determining the target viewing position is based on a digital or optical focal length of the content capturing device, a location of the subject or the first object, and one or more rules specifying a weight of the subject or the first object in digital images of the subject.

7. The method of claim 1, comprising:

determining, based on one or more cinematographic or artistic rules specifying that the subject is to be emphasized, that the content capturing device shall move away from the subject while zooming in on the subject;

submitting, to the carrier, a first command instructing the carrier to move away from the first object; and submitting, to the carrier or to the content capturing device, a second command instructing the content capturing device to increase focal length.

8. The method of claim 1, wherein:

the audio signals are received from the content capturing device mounted on the carrier.

9. The method of claim 1, comprising:

determining, by the one or more processors, that the subject generates a sound that is louder by at least a threshold level over sound generated by other sound sources, wherein determining the movement of the content capturing device includes determining a movement that is toward the subject.

10. The method of claim 1, comprising:

receiving a digital model of a venue, the digital model defining a three-dimensional space around the venue;

receiving an input specifying areas of the venue, each area corresponding to a space where a performer is positioned;

determining a reference frame for the venue and for each of the areas;

directing the carrier to one of the areas in the reference frame;

identifying individual performers from the images; and directing the carrier to follow movements of an individual performer and capture the audio and visual information.

11. The method of claim 1, comprising:

determining, by the one or more processors, a representation of a first start synchronization signal embedded in the video images;

receiving, by the one or more processors from a microphone coupled to a controller device that remotely controls the carrier, an audio recording;

determining, by the one or more processors, a representation of a second start synchronization signal embedded in the audio recording;

temporally aligning the video images and the audio recording at an alignment position corresponding to the first start synchronization signal and the second start synchronization signal;

generating an output recording by incorporating at least a portion of the audio recording into the video images from the alignment position; and providing the output recording to a presentation device or a storage device.

12. The method of claim 11, wherein:

the first start synchronization signal includes a flash or a radio frequency (RF) signal emitted by the controller device; and the second start synchronization signal includes a sound signal generated by the controller device at a time the controller device emits the first start synchronization signal.

13. The method of claim 11, comprising:

presenting, by the one or more processors, a user interface for incorporating the audio recording into the video images, the user interface presenting time alignment information for temporally aligning the video images and the audio recording based on the first start synchronization signal and the second start synchronization signal.

14. The method of claim 1, comprising:

emitting, by a controller device carried by the subject, a guiding signal that directs the carrier to follow movements of the controller device;

detecting, by the controller device, a triggering event for starting recording content;

in response to the triggering event for starting the recording:

recording, by an audio capturing device coupled to the controller device, the content into an audio recording;

emitting a first start synchronization signal that indicates to the content capturing device a time of starting recording the content; and inserting a second start synchronization signal into the audio recording, the second start synchronization signal indicating the time of starting recording the content; and providing the audio recording from the controller device to a synchronization device that is configured to synchronize the video images and the audio recording based on the first start synchronization signal and the second start synchronization signal.

15. The method of claim 14, comprising:

detecting, by the controller device, a triggering event for stopping recording the content by the audio capturing device; and in response to the triggering for stopping recording the content:

emitting a first stop synchronization signal that indicates to the content capturing device a time of stopping the audio recording; and inserting a second stop synchronization signal into the audio recording, the second stop synchronization signal indicating the time of stopping the recording.

16. The method of claim 1, comprising:

receiving, by the one or more processors, a guiding signal from a controller device;

instructing, by the one or more processors, the carrier to follow the controller device according to the guiding signal while the content capturing device captures the video images;

receiving, by the one or more processors from the controller device, a first start synchronization signal indicating that an audio capturing device coupled to the controller device starts to record audio content;

inserting, by the one or more processors, a representation of the first start synchronization signal into the video images; and providing, by the one or more processors, the first content recording to a synchronization device that is configured to synchronize the video images and the audio content based on the first start synchronization signal and a second start synchronization signal in the audio content.

17. A system, comprising:
one or more processors;
a carrier;
a content capturing device mounted on the carrier; and
at least one non-transitory computer-readable medium storing instructions that, when executed by the one or more processors, cause the one or more processors to perform operations comprising:
   receiving, from the content capturing device mounted on the carrier, video images of a subject;
   receiving audio signals associated with the subject and at least one other subject;
   determining, based at least in part on the video images or audio signals, a movement of the subject;
   determining a counter movement of the content capturing device that corresponds to the movement of the subject and maintains or restores a balanced sound level of the audio signals; and
   submitting one or more commands to the carrier, the one or more commands operable to cause the carrier to move in accordance with the movement of the content capturing device.

18. The system of claim 17, wherein:
the carrier includes an unmanned aerial vehicle (UAV), the movement of the content capturing device is represented as a flight path of the UAV,
the content capturing device includes a video camera, and
the video images includes at least one of still digital images or motion videos.

19. The system of claim 17, further comprising a controller device, the controller device coupled to an audio capturing device configured to perform operations comprising:
   capturing an audio recording;
   transmitting a first temporal synchronization signal to the content capturing device; and
   inserting a second temporal synchronization signal in the audio recording, the first temporal synchronization signal and the second temporal synchronization signal usable to temporally align the video images and the audio recording.

20. At least one non-transitory computer-readable medium storing instructions that, when executed by one or more processors, cause the one or more processors to perform operations comprising:
   receiving, from a content capturing device mounted on a carrier, video images of a subject;
   receiving audio signals associated with the subject and at least one other subject;
   determining, based at least in part on the video images or audio signals, a movement of the subject;
   determining a counter movement of the content capturing device that corresponds to the movement of the subject and that maintains or restores a balanced sound level of the audio signals; and
   submitting, to the carrier, one or more commands, the one or more commands operable to cause the carrier to move in accordance with the movement of the content capturing device.

* * * * *